US012443912B2

(12) United States Patent
Freeman et al.

(10) Patent No.: US 12,443,912 B2
(45) Date of Patent: *Oct. 14, 2025

(54) SYSTEM AND METHOD FOR PROVIDING DISPARATE NETWORKED, OFF-ROAD GUIDANCE IN RURAL AREAS

(71) Applicant: Agrellus, Inc., Lubbock, TX (US)

(72) Inventors: Alan Freeman, Brownfield, TX (US); Brice Kelly, Brownfield, TX (US)

(73) Assignee: Agrellus, Inc., Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,188

(22) Filed: Sep. 29, 2023

(65) Prior Publication Data

US 2024/0152861 A1    May 9, 2024

Related U.S. Application Data

(63) Continuation of application No. 15/354,969, filed on Nov. 17, 2016, now Pat. No. 11,775,924.

(60) Provisional application No. 62/256,670, filed on Nov. 17, 2015.

(51) Int. Cl.
| | |
|---|---|
| G06Q 10/0835 | (2023.01) |
| G01C 21/36 | (2006.01) |
| G01S 19/42 | (2010.01) |
| G06Q 10/083 | (2023.01) |
| G06Q 10/0833 | (2023.01) |
| G06Q 30/0601 | (2023.01) |
| G06Q 50/02 | (2012.01) |

(52) U.S. Cl.
CPC ... *G06Q 10/08355* (2013.01); *G01C 21/3614* (2013.01); *G01C 21/3667* (2013.01); *G01S 19/42* (2013.01); *G06Q 10/0833* (2013.01); *G06Q 10/0838* (2013.01); *G06Q 30/0633* (2013.01); *G06Q 50/02* (2013.01)

(58) Field of Classification Search
CPC ............ G06Q 10/083; G06Q 10/0832; G06Q 10/0833; G06Q 10/0835
USPC ....................................................... 705/333
See application file for complete search history.

(56) References Cited

U.S. PATENT DOCUMENTS

| | | |
|---|---|---|
| 6,356,836 B1 | 3/2002 | Adolph |
| 6,356,837 B1 | 3/2002 | Yokota et al. |
| 6,374,183 B1 | 4/2002 | Oshida et al. |
| 9,743,239 B1 | 8/2017 | Mishra |

(Continued)

OTHER PUBLICATIONS

Rovira-Más, Francisco, and Ratul Banerjee. "GPS data conditioning for enhancing reliability of automated off-road vehicles." Proceedings of the institution of mechanical engineers, part D: journal of automobile engineering 227.4 (2013): 521-535. (Year: 2013).*

(Continued)

*Primary Examiner* — Emmett K. Walsh
(74) *Attorney, Agent, or Firm* — Foley & Lardner LLP

(57) ABSTRACT

A system and method for providing a listing service for farmers in rural areas. A farmer may be able to "drop a pin" on an interactive map to a location, such as a barn, to where supplies may be delivered by a delivery driver. By providing such a map, natural barriers to entry into a marketplace may be broken down for suppliers, thereby enabling a marketplace to expand with suppliers.

20 Claims, 24 Drawing Sheets

(56) References Cited

U.S. PATENT DOCUMENTS

| | | | |
|---|---|---|---|
| 2005/0065719 A1* | 3/2005 | Khan | G08G 1/0969 |
| | | | 701/409 |
| 2005/0251331 A1 | 11/2005 | Kreft | |
| 2007/0129880 A1 | 6/2007 | Thacher | |
| 2007/0260628 A1 | 11/2007 | Fuchs et al. | |
| 2008/0059057 A1* | 3/2008 | Tengler | G01C 21/3626 |
| | | | 701/465 |
| 2008/0195538 A1* | 8/2008 | Lutnick | G06Q 50/12 |
| | | | 705/40 |
| 2009/0119009 A1* | 5/2009 | Dicke | G01C 21/3673 |
| | | | 701/533 |
| 2010/0169000 A1 | 7/2010 | Overgoor et al. | |
| 2010/0235527 A1 | 9/2010 | Pelton et al. | |
| 2010/0332116 A1* | 12/2010 | Sakashita | G01C 21/20 |
| | | | 701/533 |
| 2011/0087429 A1* | 4/2011 | Trum | G01C 21/3697 |
| | | | 701/533 |
| 2011/0225069 A1 | 9/2011 | Cramer et al. | |
| 2011/0246067 A1 | 10/2011 | Markham et al. | |
| 2013/0059607 A1 | 3/2013 | Herz et al. | |
| 2014/0222335 A1 | 8/2014 | Piemonte et al. | |
| 2015/0168147 A1* | 6/2015 | Duleba | G01C 21/3484 |
| | | | 701/538 |
| 2015/0302495 A1* | 10/2015 | Stuckman | H04N 23/63 |
| | | | 705/26.35 |
| 2015/0308843 A1* | 10/2015 | Ding | G01C 21/30 |
| | | | 701/411 |
| 2016/0012391 A1 | 1/2016 | Burnett | |
| 2017/0132934 A1* | 5/2017 | Kentley | G05D 1/0088 |

OTHER PUBLICATIONS

International Search Report and Written Opinion for PCT/US2016/062616, mailed Mar. 17, 2017; 11 pgs.

Rovira-Mas, Francisco, and Ratul Banerjee. "GPS data conditioning for enhancing reliability of automated off-road vehicles." Proceedings of the institution of mechanical engineers, part D: journal of automobile engineering 227.4 (Sep. 7, 2012): 521-535, 15 pps.

* cited by examiner

Windfall

Orders | Quotes | Products | Contact | My Account

New Quote for #ABC123                              1500

Morningstar Farms
9248 W Road 110 S
Shallowater, TX 79363
(806) 624-3485

Description
[ Short description of quote for customer ]

Fulfillment
[ within 1 week of order ▼ ]

Requested Products

| | Captan 80WDG – 30 lb. bag | 600 lbs. | ✓ | $2,999.00 |
| | by Allbaugh, Inc. | | | Edit \| Remove |
| | Glyphosate 4 Plus Herbicide | 40 gallons | ✓ | $499.50 |
| | by Alligare | | | Edit \| Remove |

Subtotal   $3,498.50

Optional Products   ADD

[ SUBMIT ]  ← 1502
 CANCEL   ← 1504

[ Click & Submit ]

FIG. 15

Windfall

Quote Submitted

QS35887

Morningstar Farms
9248 W Road 110 S
Shallowater, TX 79363
(806) 824-3485

Morningstar Farms Captan and generic Roundup.

Fulfillment: within 1 week of order

| | | | | |
|---|---|---|---|---|
| Captan 80WDG – 30 lb. bag | ✓ | by Allbaugh | 600 lbs. | $2,999.00 |
| Glyphosate 4 Plus Herbicide | ✓ | by Alligare | 40 gallons | $499.50 |
| | | | Total | $3,498.50 |

Windfall

Order #W46168

SHIPPED

Morningstar Farms
[address lines]

Morningstar Farms Captan and generic Roundup

Fulfillment: within 1 week of order

| | | | |
|---|---|---|---|
| Captan 80WDG – 30 lb. bag | by AltOsaugh | 600 lbs. | $2,999.00 |
| Glyphosate 4 Plus Herbicide | by Allsgate | 40 gallons | $499.50 |
| | | Total | $3,498.50 |

SYSTEM AND METHOD FOR PROVIDING DISPARATE NETWORKED, OFF-ROAD GUIDANCE IN RURAL AREAS

RELATED APPLICATIONS

This application is a continuation of U.S. patent application Ser. No. 15/354,969, filed Nov. 17, 2016, which claims priority to U.S. provisional patent application No. 62/256,670 filed on Nov. 17, 2015; the contents of each of which are hereby incorporated herein in their entirety.

BACKGROUND

Farmers use a significant amount of consumable supplies to operate farms. Such supplies include, but are not limited to, fertilizer, weed killer, seeds, and so on. As a result of a variety of cost pressures, such as the cost of seeds, water, weed killer, wages of workers, taxes, and so forth, farmers often call multiple suppliers of consumable supplies that operate in the area of the farms. As understood by farmers, the amount of time used to plan consumable supply needs, call suppliers, and order supplies consumes a significant part of a farmer's time, which, as well understood by farmers, could better be spent on many more important and productive farming activities.

Farms, especially large working farms, are quite often located in rural regions of the country. As a result, local suppliers who have operated in the rural areas tend to have a "stronghold" or significant advantage over would-be competitors as learning particular details about the farmers, farms, and geographical details in a rural area is a time-intensive endeavor. For example, learning locations of barns for deliveries of supplies that may be on or off both paved and unpaved roads (e.g., through paths on fields) is generally only learned by working directly with farmers over a period of years and may vary for a variety of reasons. The detailed knowledge that has historically been needed to support rural farming operations essentially operates to form "natural barriers to entry" of suppliers of consumable farming supplies who have not operated in the geographic regions of farms in rural areas. Moreover, as a result of mobile telephone and other communications devices coverage often being unavailable in rural geographic regions, suppliers are often only able to locate farms based on personal familiarity with small rural roadways, unpaved roadways, and field paths, when available.

SUMMARY

To reduce the administrative burden of ordering consumable farm supplies and to lower the "natural barrier to entry" for suppliers to enter into geographic regions of farms in rural areas, an interactive networked marketplace for farming supplies may be provided. The interactive networked platform may enable a farmer to submit consumable farming supplies desired, and suppliers may submit quotes for the farmers to select to purchase. The interactive networked platform may enable farmers to "drop a pin" on an electronic map representative of a location of a barn, and the location may be communicated with an order to a supplier of consumable farming supplies from which the farmer selects to purchase the desired consumable farming supplies. In one embodiment, a farmer may submit needs to a farm supply fulfillment request server that, in response, stores that farm supply for a filament request with a record associated with the farmer.

Because of the lack of or fragmented cellular network coverage by communications networks that are typically found in rural areas, mapping apps that are often used for driving directions on mobile devices are often inoperative. To assist suppliers of farming consumable supplies to be able to deliver orders to barns or other locations (e.g., specific fields) on a farm as specified by a farmer by a dropped pin on an interactive map, a delivery tracking server may be utilized to collect delivery routes to a farm, thereby being available for delivery drivers of suppliers who may be unfamiliar with a particular farm or geographic area. The delivery tracking server may utilize "big data" processing of route data from delivery drivers that may utilize mobile devices that operate on different cellular networks (e.g., AT&T, Sprint, T-Mobile, and Verizon).

By collecting tracking data of delivery drivers who make deliveries to farms, paths can be generated and superimposed on an interactive map on a mobile device so that other delivery drivers can deliver to the farms even when mobile networks have limited coverage at or near farms. Because delivery drivers may take different routes to get to a farm, the delivery tracking server may form different routes that delivery drivers take by aggregating sample points of multiple delivery drivers from various directions to a farm, thereby forming optimum and alternative paths. Such route tracking is particularly helpful in rural areas as flooding and other natural and man-made situations may cause roadways and fields to become impassable at certain times of the year or on a random basis (e.g., tornado, mud conditions, snowstorms, accidents, etc.). In such an event, delivery drivers may request help via the interactive map, mobile app, or otherwise, and be presented with the various routes that other delivery drivers have taken to the location of the dropped pin (e.g., location of barn), thereby enabling the delivery drivers to deliver to farms that would otherwise be very difficult to find given that many roadways, and certainly pass through fields, in rural areas do not have signs. Thus, by capturing historical delivery route data to farms, suppliers may operate in territories not previously commercially accessible. Hence, territories of farms in rural areas may be opened to more suppliers, thereby increasing the marketplace of farming supplies for farmers.

In one embodiment, a mapping app may be configured to estimate movement when cellular coverage is lost and/or automatically display satellite data where off-road delivery paths are needed. Superimposed historical paths of deliveries may be displayed on the map with satellite image data to show fields, dirt roads, trees, barns, etc., thereby making delivery of consumable farming supplies for delivery drivers much easier even when road signs do not exist, such as roads on private property.

Because the "natural barrier to entry" into territories may be lowered, suppliers may be able to move consumable farming supplies to geographic regions that can use those supplies. As an example, if one area of the country is dry and another area is unseasonably wet, farmers in the wet area may order more fertilizer for that area than the dry area. As such, suppliers may be able to satisfy the high demand area and deliver the consumable farming supplies to farmers in need of such supplies, thereby enabling suppliers to provide for a higher volume of product movement, and farmers to have a more stable supply marketplace.

One embodiment may provide for geo-fencing of delivery locations (e.g., 0.2 miles) to be used to alert a farmer of a delivery being made and/or notify a listing service of the delivery. The listing service may list products and/or services of agricultural supplies to enable sellers of the products and/or services to connect with buyers, such as farmers, of the products and/or services, thereby creating an online marketplace. A delivery driver may be provided with a "delivery complete" soft-button on the mobile app that, when selected, updates an order record to close the order. A "delivery complete" message may be real-time delivered or be stored for a later delivery in the event that communication services are unavailable. The delivery complete message may trigger a billing function for the listing service to bill a selected supplier who supplies the consumable farming supplies. Alternatively, the delivery complete message may simply notify the listing service to invoice a supplier for a transaction commission. Other uses of the delivery complete message may be utilized.

One embodiment of a system for providing directional guidance to a driver of goods to a destination location may include a data repository configured to store historical positional locations of delivery drivers who previously delivered goods to a destination location. The positional locations may be based on geographic coordinates from electronic devices carried by vehicles used to make the deliveries. The electronic devices may be mobile electronic devices or be electronic devices mounted on or within the vehicles. A processing unit may be configured to receive a destination location and access the data repository to identify historical positional locations associated with the destination location. At least a portion of the historical positional locations may be communicated to a mapping application being executed by an electronic device of a delivery driver. At least a portion of the historical positional locations may cause the mapping application to display the historical positional locations on a map to provide driving directions for the delivery driver.

One embodiment of a method for providing directional guidance to a driver of goods to a destination location may include storing historical positional locations of delivery drivers who previously delivered goods to a destination location. A destination location may be received. Historical positional locations associated with the destination location may be identified. At least a portion of the historical positional locations may be communicated to a mapping application being executed by an electronic device of a delivery driver, where at least a portion of the historical positional locations may cause the mapping application to display the historical positional locations on a map to provide driving directions for the delivery driver.

BRIEF DESCRIPTION

A more complete understanding of the method and apparatus of the present invention may be obtained by reference to the following Detailed Description when taken in conjunction with the accompanying Drawings wherein:

FIG. 6 is a screenshot of an illustrative user interface that enables a supplier to enter business information, regions served, and product information of products that the supplier carries;

FIG. 7 is a screenshot of an illustrative user interface that enables a supplier to select products from an extensive product database that the supplier carries;

FIG. 8 is a screenshot of an illustrative user interface that enables a supplier to view requests for quotes for supplies submitted by farmers;

FIGS. 9-15 are screenshots of illustrative user interfaces that enable a supplier to submit a quote to fulfill a request for quote for a farmer;

FIG. 16 is a screenshot of an illustrative user interface that shows a submitted quote by the supplier;

FIG. 17 is a screenshot of an illustrative user interface that shows list of pending orders from quotes by a supplier that were accepted by farmers and listed in order by status thereof;

FIG. 18 is a screenshot of an illustrative order that was paid;

FIG. 19 is a screenshot of an illustrative order that was shipped;

FIG. 20 is a screenshot of an illustrative order that was paid; and

DETAILED DESCRIPTION OF THE DRAWINGS

Figure 1:
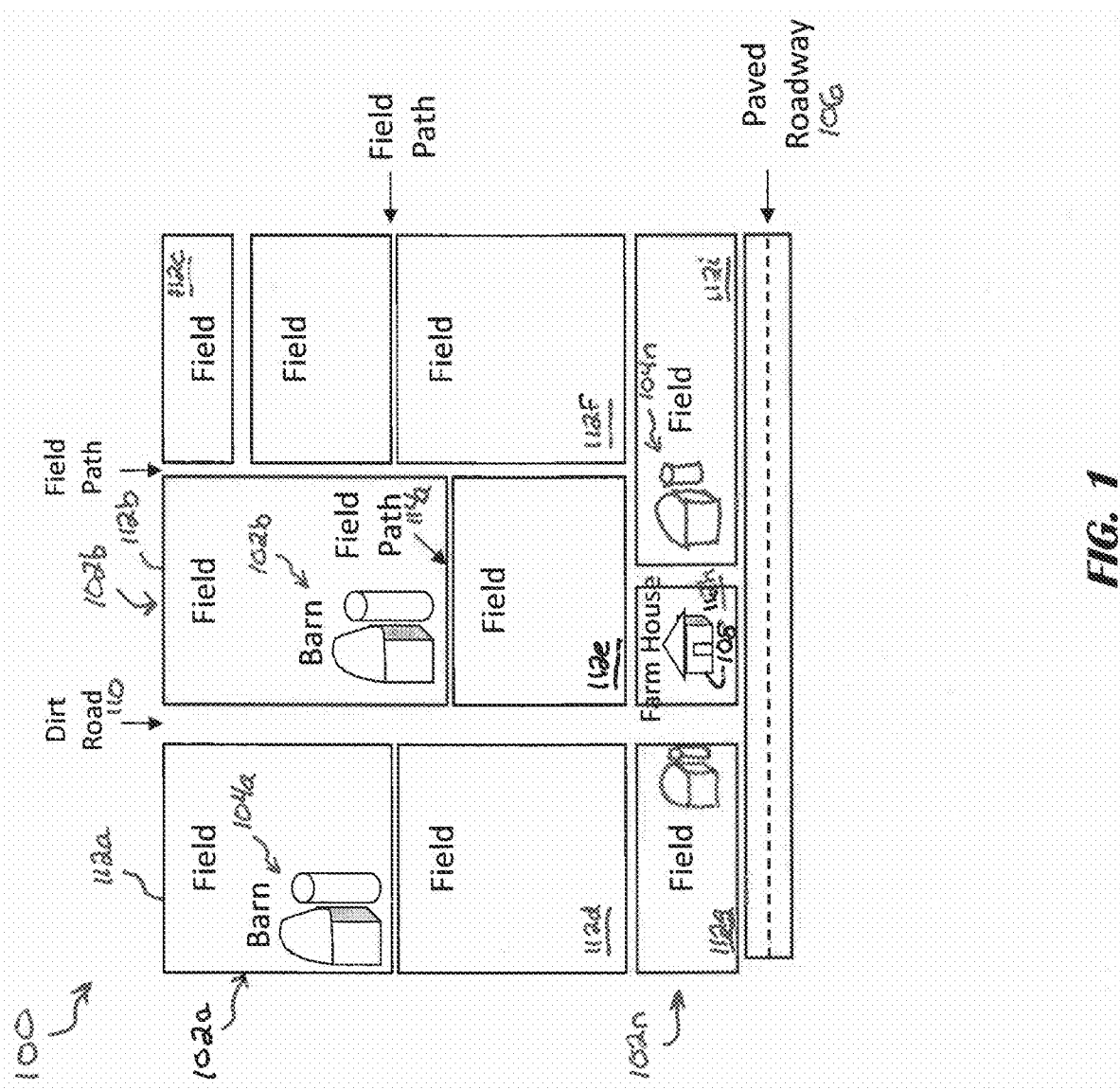
FIG. 1 is an illustration of an illustrative overhead view of farms in a rural geographic area.

With regard to FIG. 1, an illustration of an illustrative overhead view of a rural geographic area map 100 inclusive of farms 102*a*-102*n* (collectively 102) is shown. The map illustrates how challenging delivery to farms and specifically barns 104*a*-104*n* (collectively 104) in rural communities can be difficult, as being able to locate a specific barn belonging to a specific farmer along unmarked, dirt roads and/or paths on or between fields may be challenging during growing seasons, because roads are not marked, and many other reasons as previously described. Because of the difficulty of delivering consumable farming supplies to farms, a natural "barrier to entry" exists, where suppliers who have operated in geographic regions have a strong competitive advantage in the marketplace. As such, other suppliers are limited from entering the geographic region and, thus, causing a limited marketplace for farmers in that geographic area. As a result, supplies that may be needed due to natural events, such as heavy rains, dry times, increased levels of bugs, plant diseases, etc., are often unavailable to farmers on an as-needed basis without high costs or impractical delay in delivery.

The barns 104 are shown on the map 100. The barns 104 may belong to different farmers. In this case, the barn 102b may belong to a farmer who is ordering consumable farming supplies. It should be understood that other products or services may be ordered using the principles described herein. A paved roadway 106 is shown to pass by a farm house 108 of the farmer. A dirt road 110 may extend past the farm house 108 and between fields 112a/112d/112g and 112b/112e, as shown. A delivery to the farmer may use a field path 114a to get to the barn 112b. Because the field path 114a may not be marked or may be difficult to know specifically which field path is to take, especially during growing season, the farmer may "drop a pin" at the barn 112b, as shown in FIG. 2.

Figure 2:
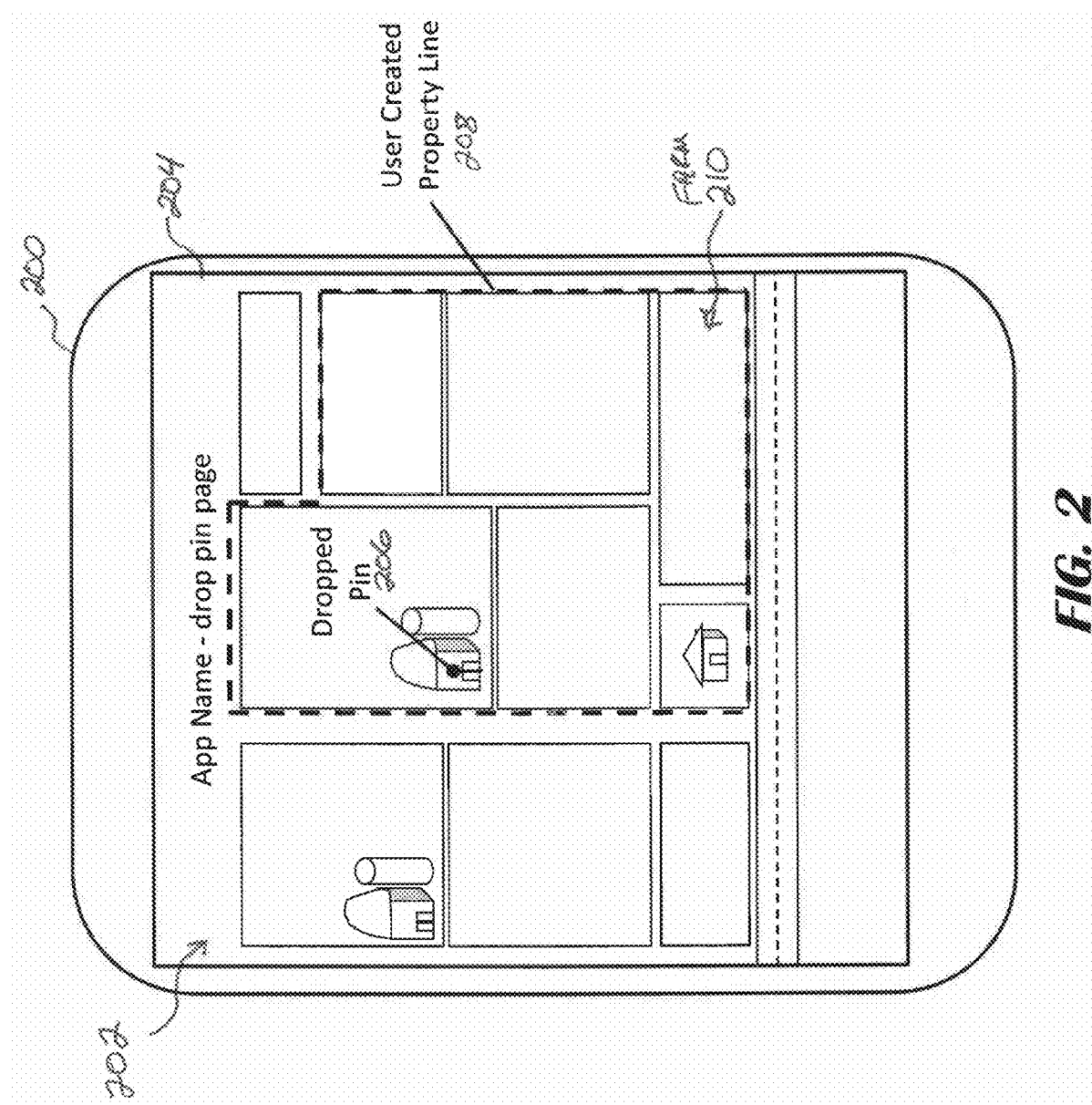
FIG. 2 is an illustration of an illustrative interactive map that enables a farmer to drop a pin to indicate a location for a supplier of consumable farming supplies to deliver the supplies.

With regard to FIG. 2, an illustration of an illustrative electronic device 200 on which an illustrative interactive map 202 may be displayed on an electronic display 204, where the map 202 enables a farmer to "drop a pin" (dropped pin 206) to indicate a location for a supplier of consumable farming supplies to deliver the supplies is shown. The pin 206 may be dropped using an interactive user interface that includes a drop pin feature (not shown). In the case of the interactive user interface being on a desktop, laptop, or tablet computer, a graphical user interface (GUI) tool may be used to position a pin on a map displayed on a screen. In the case of the interactive user interface being operated on a mobile device that includes global positioning system (GPS) or other (e.g., triangulation) geographic location capability, a "drop pin" soft-button (not shown) may allow for the user to be physically present where he or she would like for a delivery to be made. In that regard, the user may request that deliveries be made at a barn or any other location on a property (e.g., at a specific location of a field). When a pin is dropped, the geographic coordinates (e.g., GPS coordinates or coordinates supported by another coordinate system) may be stored in association with an account of the user. These geographic coordinates may be communicated with an order request so that a delivery driver may select the location, and a mapping program, such as Google Maps® may automatically use those coordinates to assist the delivery driver.

As further shown in FIG. 2, a user created property line 208 may be drawn by a farmer to show a property line of the farm 210. The property line 208 may be particularly helpful to delivery drivers who are trying to deliver supplies to the farmer. In one embodiment, a geofence may be formed and upon a delivery driver entering the geofence defined by the property line, messaging and communications may occur. In the event that the delivery driver is out-of-range of a communications network, messaging may be stored by a delivery application operating on an electronic device of the delivery driver until within range of the cellular network.

Figure 3:
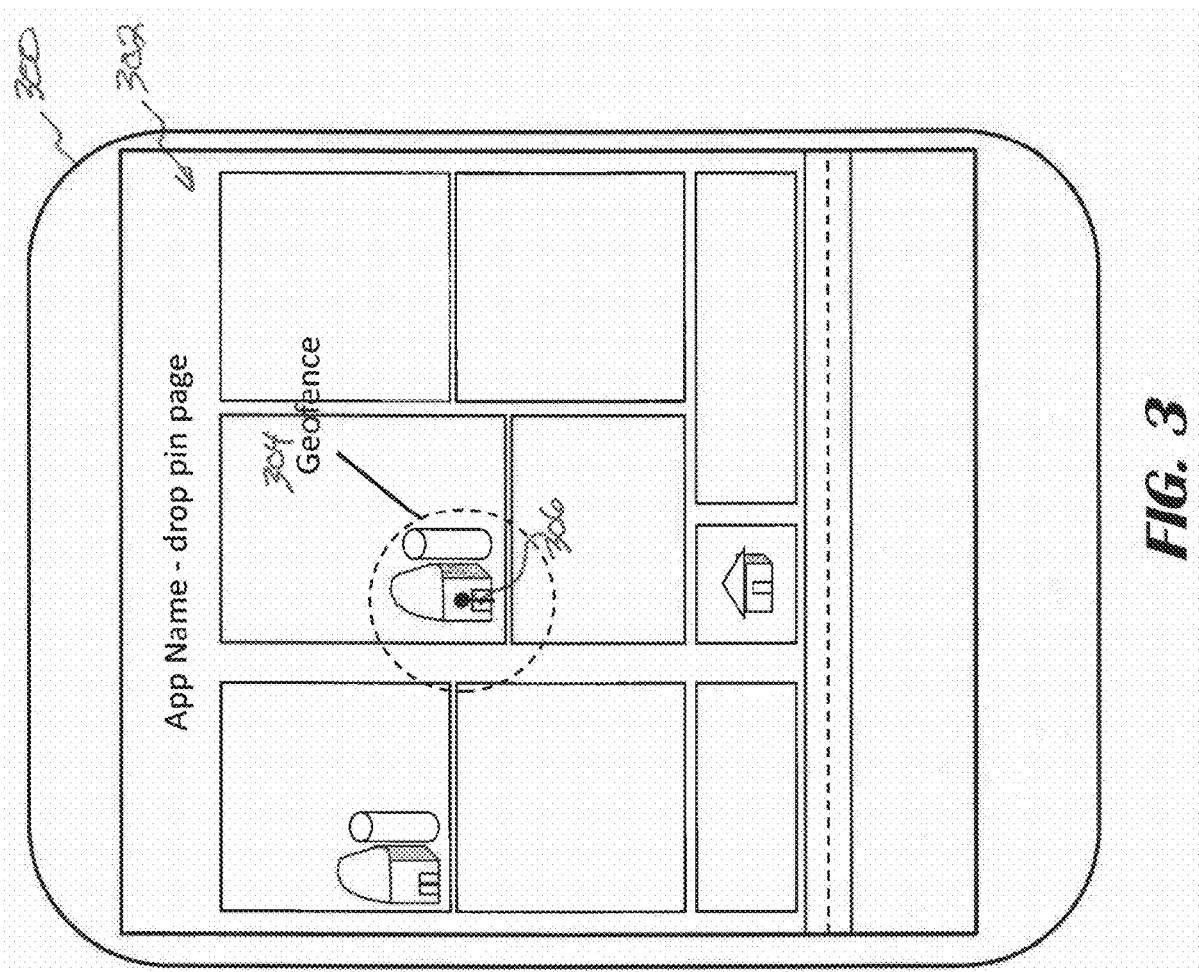
FIG. 3 is an illustration of an illustrative interactive map that enables a farmer to create or otherwise cause a geofence to be positioned around the dropped pin to cause a notification or otherwise to be created upon a delivery driver entering the geofence.

With regard to FIG. 3, an illustration of an illustrative electronic device 300 that is displaying an illustrative interactive map 302 that enables a farmer to create or otherwise cause a geofence 304 to be positioned around a dropped pin 306 to cause an electronic notification (e.g., text message) or otherwise to be created upon a delivery driver entering the geofence 304 is shown. The interactive user interface may provide for a user to enter or select a geofence diameter (e.g., ¹⁄₁₀ mile, ¼ mile, ½ mile, 1 mile, or other measure). The user interface may alternatively enable the user to create a geofence using a non-circular technique, such as selecting a roadway, field, or other location or geographical feature on a map or feature list. In one embodiment, a management system (see FIG. 3) may receive an electronic notification that the delivery driver crossed the geofence 304, and may automatically update a record in a database to indicate delivery being made. It should be understood that other and/or additional safeguards for delivery and acceptance of consumable farming supplies or otherwise may be provided.

Figure 4:
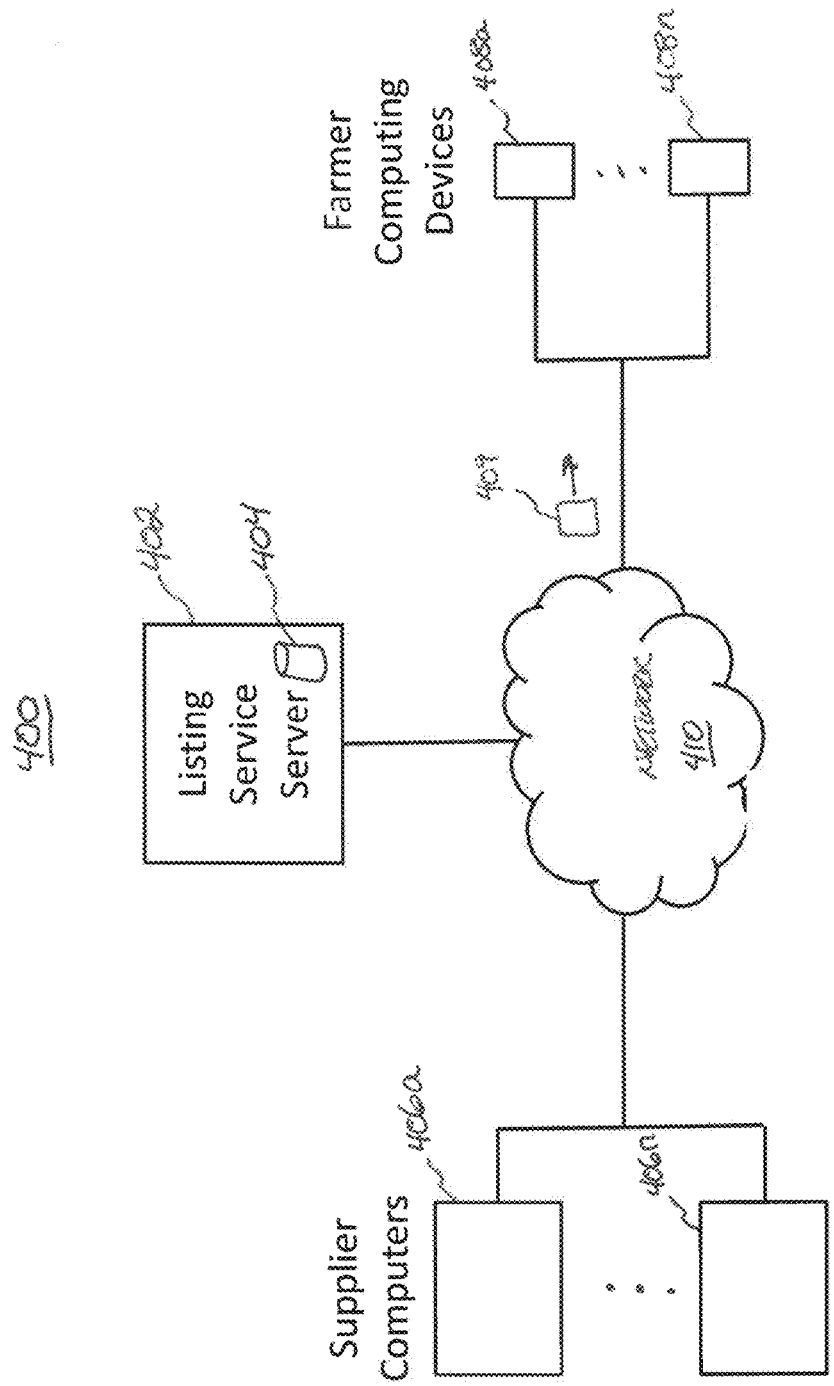
FIG. 4 is an illustration of a network environment used to support a listing service platform that enables farmers to submit consumable farming supply needs, and suppliers to submit quotes that fill the needs of the farmers.

With regard to FIG. 4, an illustration of a network environment 400 used to support a listing service platform that enables farmers to submit consumable farming supply needs, and suppliers to submit quotes that fill the needs of the farmers is shown. Although described in the context of farmers, it should be understood that the listing service platform may alternatively be configured to support other rural workers, such as ranchers, oil drillers, etc. A listing service server 402 may be used to manage a database 404 inclusive of many thousands of consumable farming supplies that one or more suppliers distribute to farmers. The listing service server 402 may also be configured to provide for managing certain data transactions. The listing service server 402 may enable suppliers using supplier computers 406a-406n (collectively 406) to manage accounts and supplies available for farmers using farmer computing devices 408a-408n (collectively 408). The farmer computing devices 408 may be any mobile or stationary electronic device that enables the farmer to access a listing 409 available to be accessed via a website or app being supported by the listing service server 402 via a network 410. The database 404 may be configured to store accounts of each of the suppliers and farmers who participate in the listing service, as further provided herein.

Although the listing service is meant to provide a "middle man" position for connecting buyers to sellers, the listing service server 402 may provide certain technologies to farmers and suppliers that allow for farmers and suppliers to interact in ways heretofore not possible, and open markets to suppliers that were not previously possible due to "natural barriers to entry" existing in the rural areas where farms exist. Such technologies are further described hereinbelow, and shown in the figures.

Figure 5:
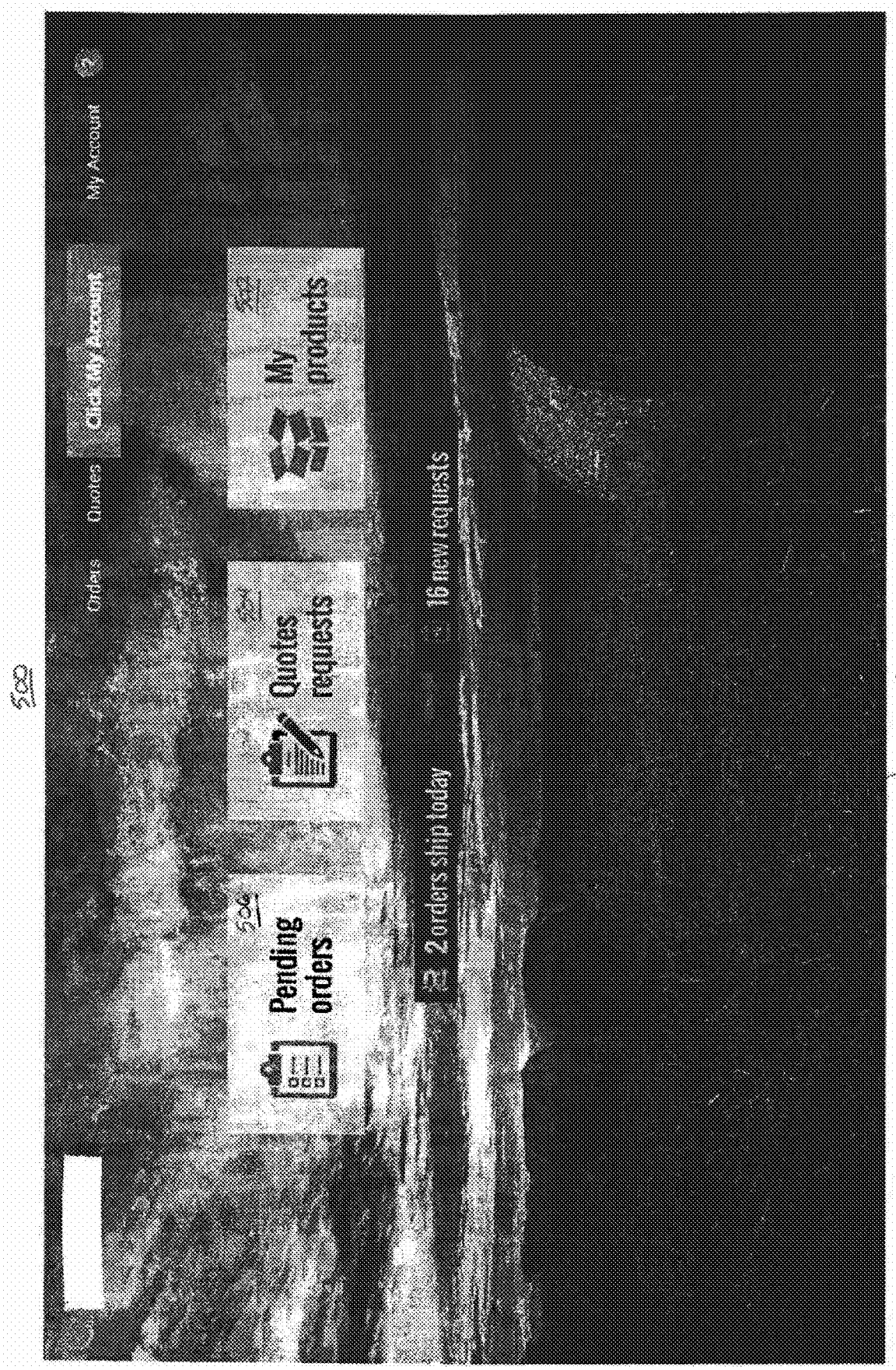
FIG. 5 is a screenshot of an illustrative user interface that enables a supplier to manage a supplier business with three main functions, including establishing products that the supplier carries, review requests and submit quotes, and review pending orders.

With regard to FIG. 5, an illustration of an illustrative user interface 500 that enables a supplier to manage a supplier business with three main functions, including establishing products that the supplier carries, review requests and submit quotes, and review pending orders is shown. The functions may be accessed via a "My products" soft-button 502, "Quotes requests" soft-button 504, and "Pending orders" 506 soft-button 508.

Figure 6:
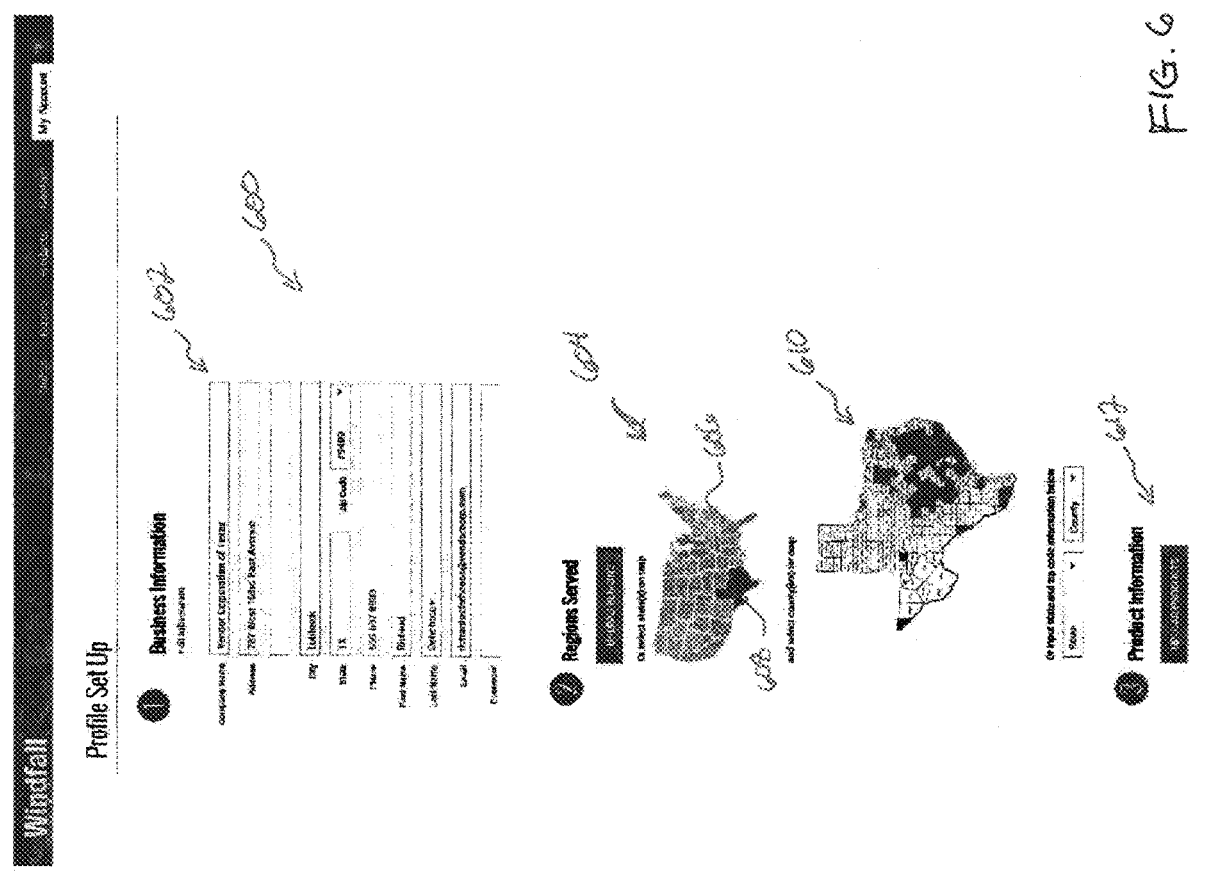

With regard to FIG. 6, a series of screenshots of an illustrative user interface 600 that enables a supplier to enter business information, regions served, and product information of products that the supplier carries is shown. As shown, an input screen 602 may enable a supplier to enter supplier name, address, contact information, user name, email or other network address, and so on. A graphical user interface 604 with a map 606 with selectable geographic regions, such as states, for a user to select to indicate region(s) where a supplier services. As shown, the supplier may select the state of Texas 608, which, in turn, may cause a second map 610 representative of the geographic region, in this case Texas, that has further selectable regions (e.g., counties, towns, etc.) for the user to select to further indicate region(s) in which the supplier services. It should be understood that alternative configurations of a graphical or non-geographical user interface for the supplier to select and submit regions served. A selectable soft-button 612 or other selectable element may enable the user to upload or otherwise select products that the supplier distributes in one or more of the regions served as selected by the user.

Figure 7:
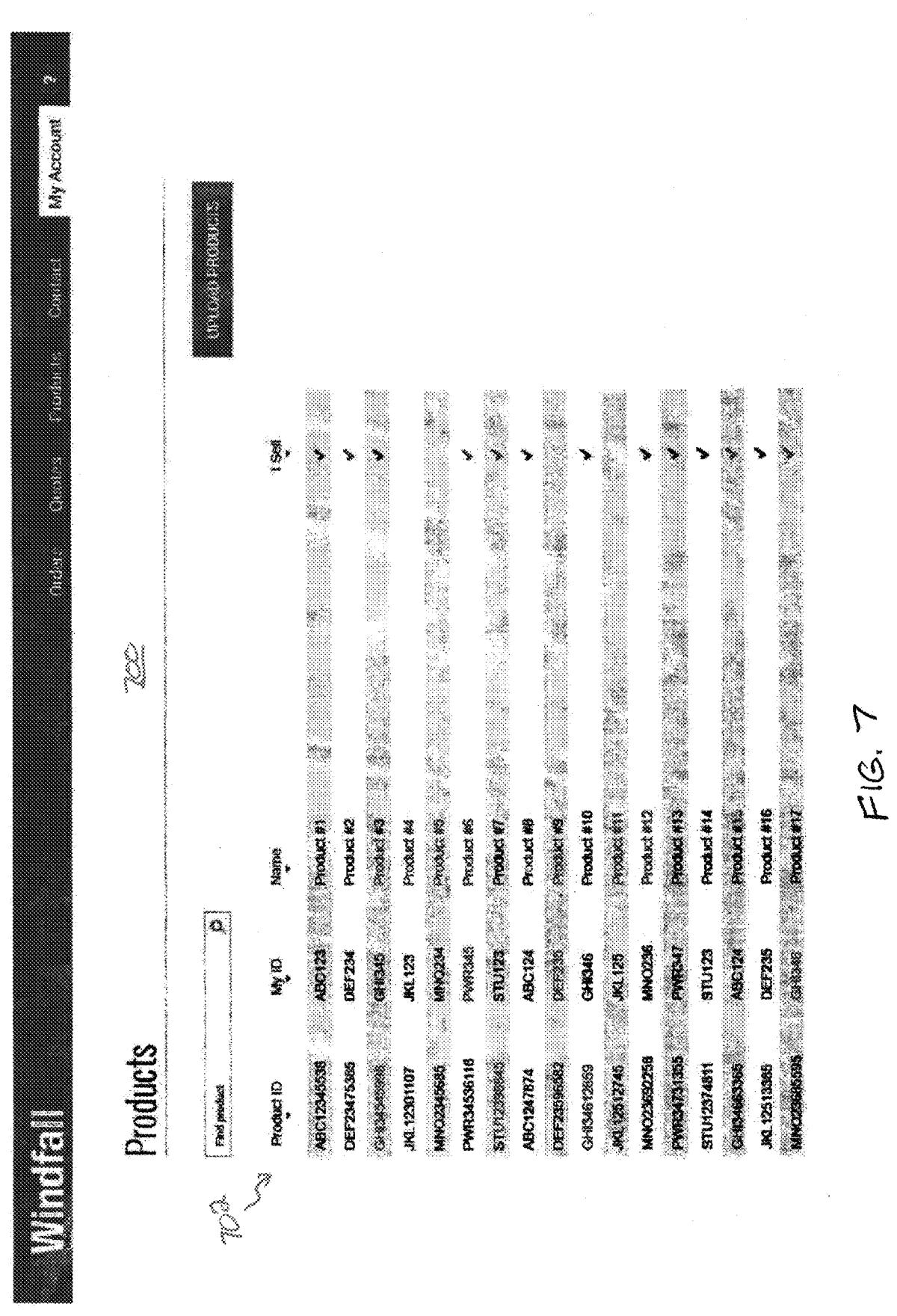

With regard to FIG. 7, a screenshot of an illustrative user interface 700 that enables a supplier to select products from a list 702 stored in an extensive product database that a supplier carries is shown. The extensive product database may include a comprehensive list of many, most, or all commercially available products for farmers to purchase for use on farms. A set of services may also be available for a supplier of services may also be available. The list 702 may include a product ID, my ID, and product name. Selection elements, such as check boxes, associated with each of the products may be available for a user to select which of the products the supplier sells. The user may specify specific geographic locations in which the selected products are available if a supplier sells different products in different geographic locations.

With regard to FIG. 8, a screenshot of an illustrative user interface 800 that enables a supplier to view requests for quotes 801 for supplies submitted by farmers is shown. Each of the request for quotes 801 may include a number of fields, including status, quote #, due date, name of requestor, zip code, and date of request. In addition, a "My Area" field may be shown that identifies each request that is within an area that a supplier services based on geographic region of delivery or otherwise. To provide filtering capabilities for a supplier who would like to submit a bid to the requests for quotes 801, the interface 800 may provide for a number of filter fields 802 in which a user may enter filter terms. The fields 802 may include quote #, due date, name, zip code, date of request. To enable a supplier to create a quote, each of the requests for quotes 801 may be individually selectable, and a user interface, as shown in FIG. 9, will be displayed for the user.

Figure 9:
Figure 10:
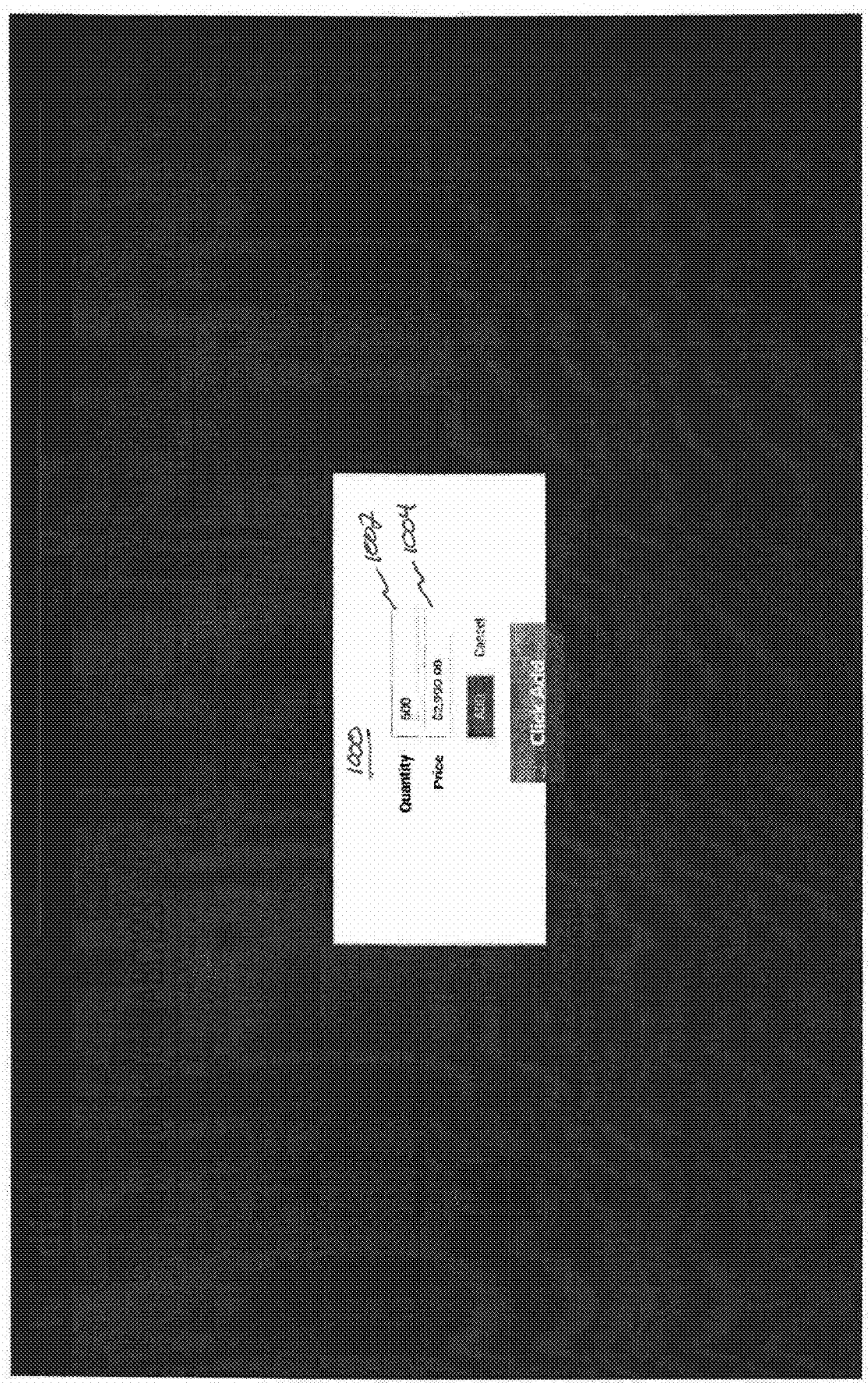

With regard to FIGS. 9-15, screenshots of illustrative respective user interfaces 900-1500 that enable a supplier to submit a quote to fulfill a request for quote for a farmer is shown. In FIG. 9, the user interface 900 includes a description text entry field 902 to name the quote and fulfillment selection field 904 to set a date for fulfillment of the order. In addition, a selectable listing 906 of each product and metrics (e.g., weight) of each product that was requested by a customer may be listed for a supplier to quote. The system may enable the suppler to quote full or partial fulfillment of orders, as enabled in a user interface 1000, which may be a pop-up window, new page, or other user interface. As shown in FIG. 10, in response to the user selecting a selectable product listing from the user interface 900 of FIG. 9, the user may be presented with quote fulfillment entry and/or selection fields 1002 and 1004 to entry quantity and price, respectively. Additional and/or alternative fields may be provided depending on the product or service being quoted. However, by providing a common fields for each supplier, a customer may make an apples-to-apples comparison across multiple suppliers, and if two suppliers are only able to fulfill a portion that combined fulfills an entire order, the customer may accept both partial fulfillments.

Figure 11:
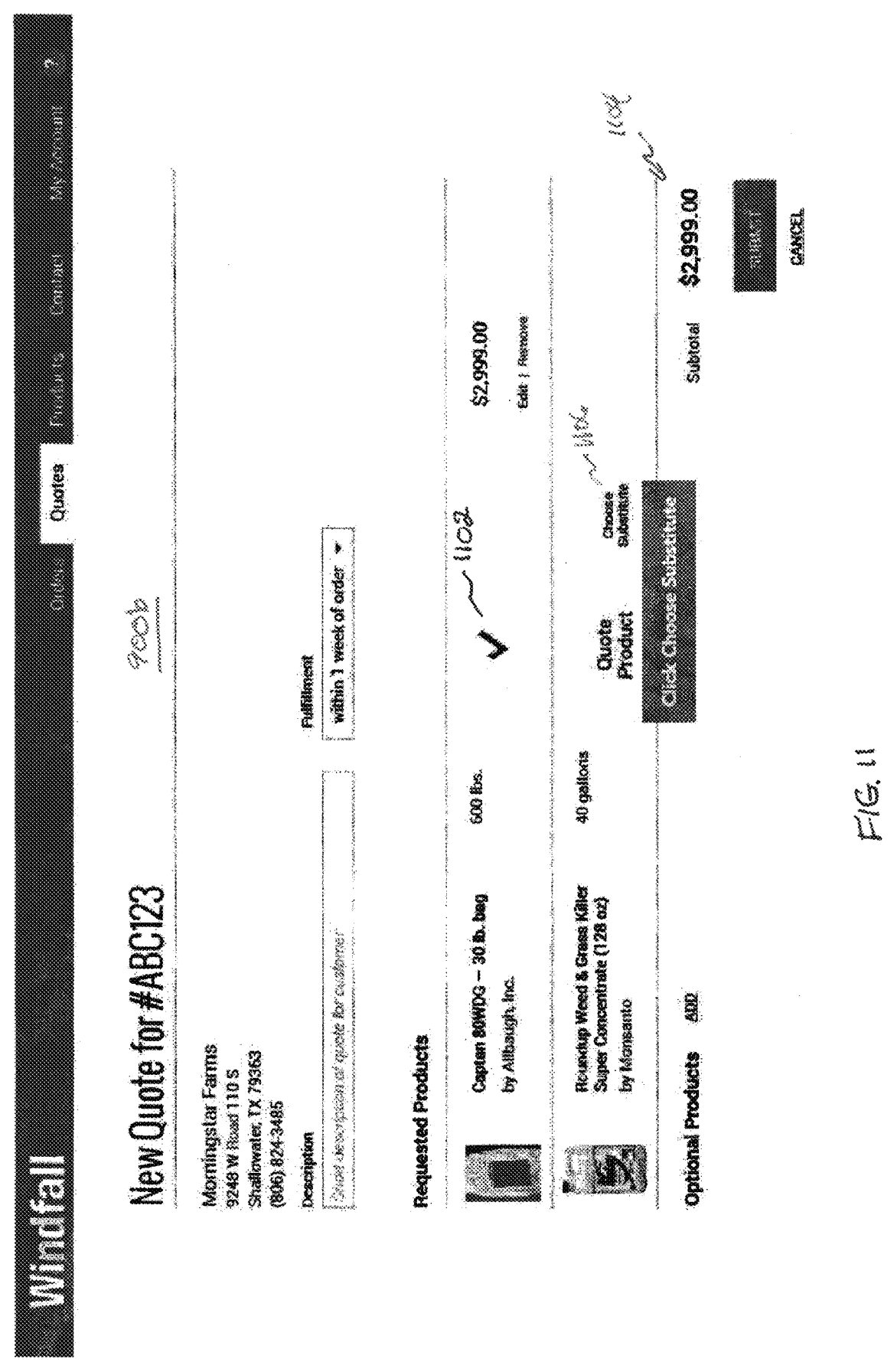

As shown in FIG. 11, a user interface 900b is an update of the user interface 900a of FIG. 9 that shows the supplier which requested products the supplier has quoted. In this case, an indicator 1102, in this case a check mark, shows that the user that a quote has been or is ready to be submitted to the system for the customer to review. A total amount field 1104 of the quotes may also be listed for the supplier. If the supplier does not carry a requested product, but carries a substitute product (e.g., different brand of fertilizer), then the user may select a "Choose Substitute" soft-button 1106.

Figure 12:
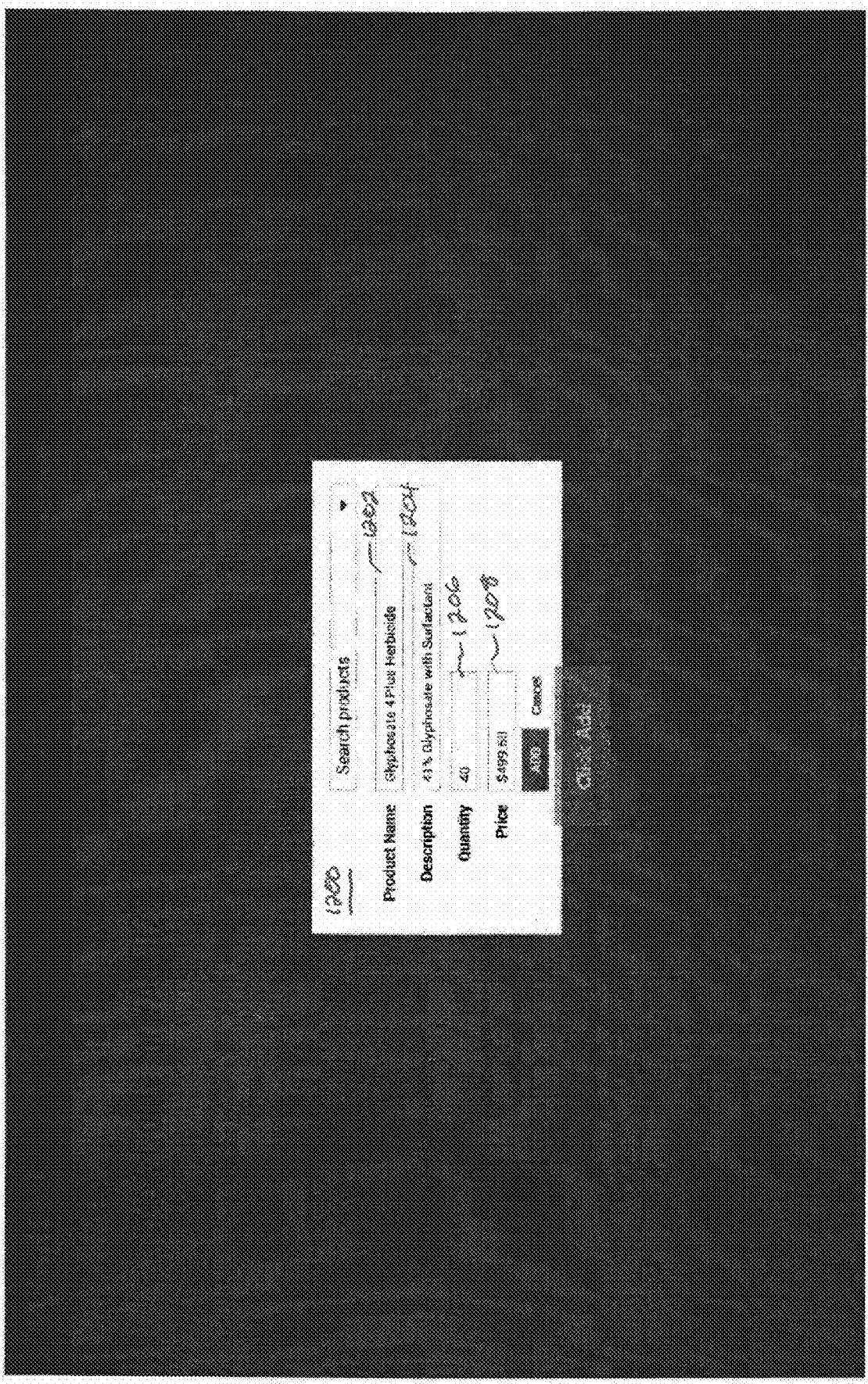

As shown in FIG. 12, another illustrative user interface 1200 includes a number of fields 1202-1208 for a supplier to add a substitute product that may be used to provide a quote to a requested product. The use of this user interface 1200 allows for a supplier to replace a requested product with a comparable product that a farmer may be able to use as an alternative to a specifically requested product (e.g., specific fertilizer brand). Because there may be alternative brands that a supplier carries, a supplier who knows specific products that are carried by the supplier that a comparable to other products on the market that the supplier does not carry, the supplier may offer comparable products to customers using the interface 1200. In an embodiment, the supplier may provide an explanation for the substitute, such as "this is a generic substitute w/same active ingredient that will save you $3/gallon." The explanation may be preset by the supplier for each product or an explanation text entry field may be provided.

Figure 13:
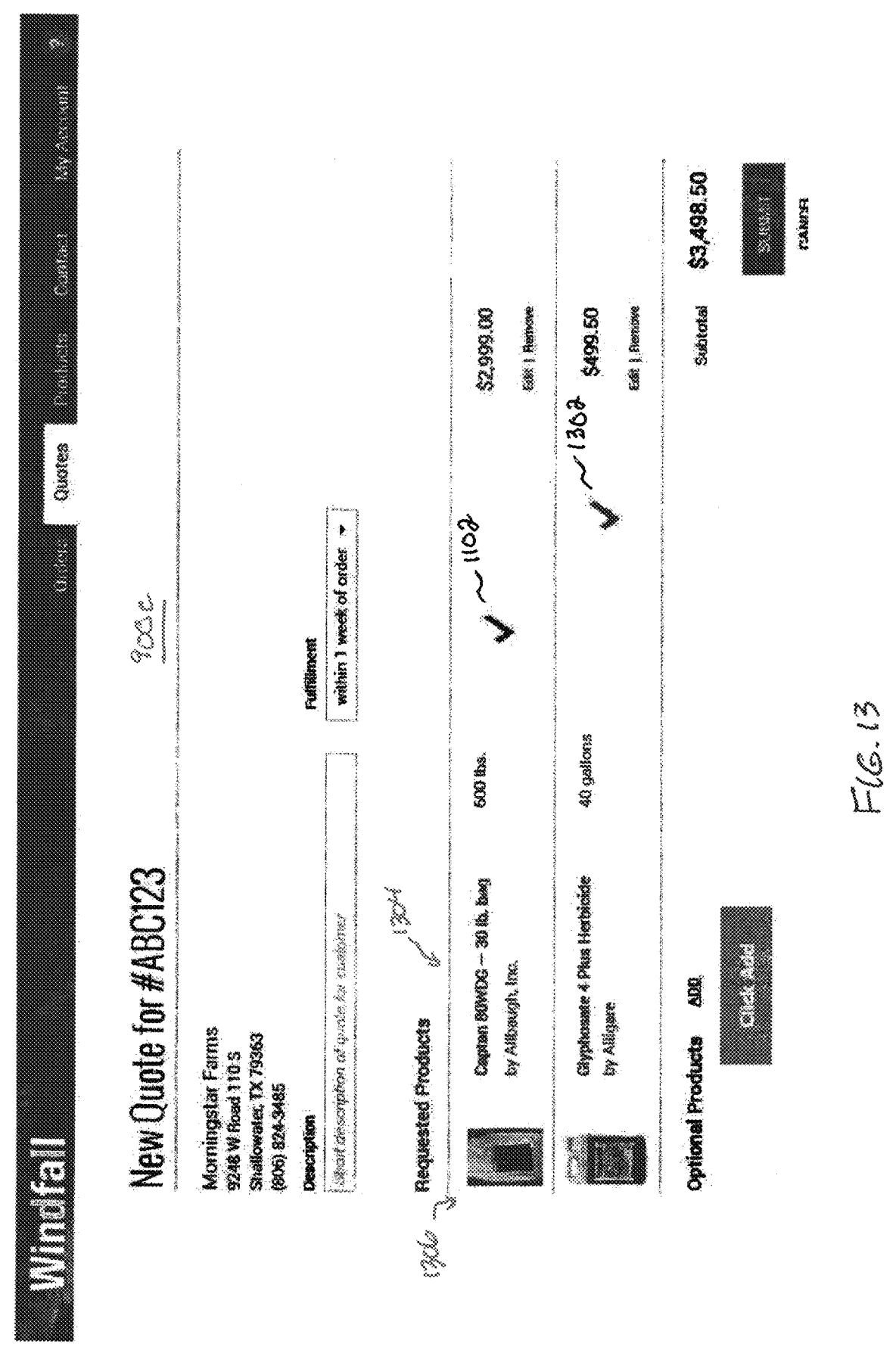

With regard to FIG. 13, a user interface 900c shows the user of the supplier that a second requested product has been quoted via the user interface 1200 of FIG. 12. Because the quoted product was a substitute product, an indicator 1302, such as a check mark, is offset from the indicator 1102 that was for the actual requested product. Alternatively and/or additionally, the indicator 1302 may be different colors. By differentiating the actual versus substitute indicator, a user of the supplier can easily identify which products the supplier carries that were requested by a customer and which ones the supplier had to substitute with another product. It should be understood that alternative indicators or alternative configurations of indicators that differentiate between matching and substitute products may be provided to the supplier. By visually differentiating the two, the ability for the supplier to utilize the system is simplified. In a quote record that may be stored in a database, a parameter that indicates whether the quoted product matches or is a substitute may be included, thereby supporting positioning of the indicators 1102 and 1302 displayed on the user interface 900c. In an embodiment, rather than storing each of the descriptions 1304 and images 1306 of the products for each quote, reference identifiers to that content may be utilized to interface with a content management system, thereby reducing memory storage capacity requirements, while maintaining the quoted information for a particular quote.

Figure 14:
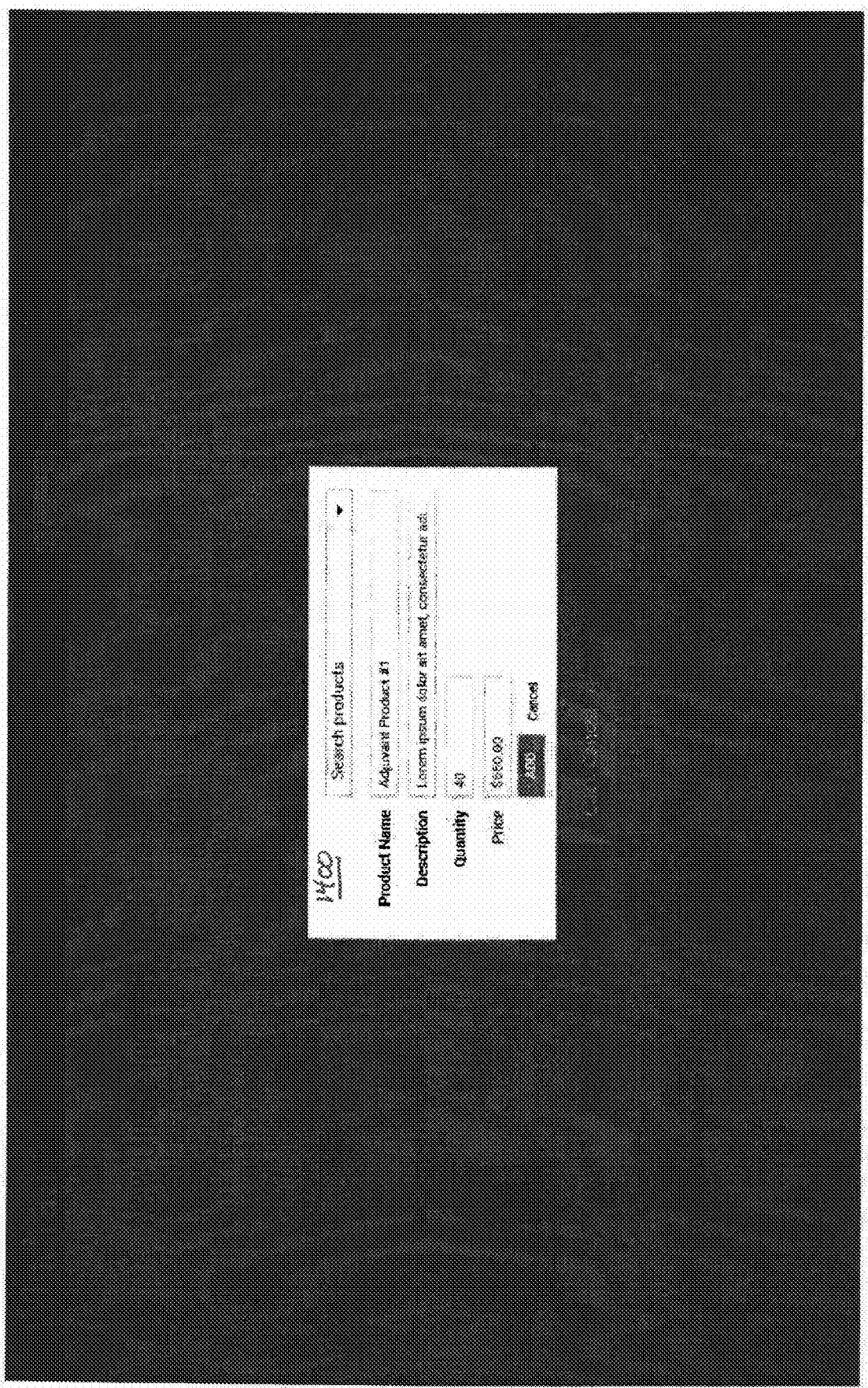

With regard to FIG. 14, a screenshot of an illustrative user interface 1400 may enable the supplier to provide for a quote. In this case, the user is shown to be searching for another substitute product. However, despite the product selected having a higher price, there may be a justification for the replacement. With regard to FIG. 15, if the user cancels from adding a replacement product from the user interface 1400, the user interface 1500, which may be the same as FIG. 13, may be redisplayed. If the user is has completed entering quotes, either all or a partial number, for the request, the user may select a "submit" soft-button 1502 to submit the quotes to the system. Alternatively, the user may cancel by selecting a "cancel" soft-button 1504. The user may also save the quotes and return at a later time to complete the submission process by selecting a "save" soft-button (not shown).

With regard to FIG. 16, a screenshot of an illustrative user interface 1600 that shows a submitted quote by the supplier in response to the user selecting to submit the quote from the user interface 1500 of FIG. 15 is shown. The user interface may provide for a summary listing 1602 of each of the products. In an embodiment, indicators 1604 to identify actual and substitute products may be shown.

Figure 17:
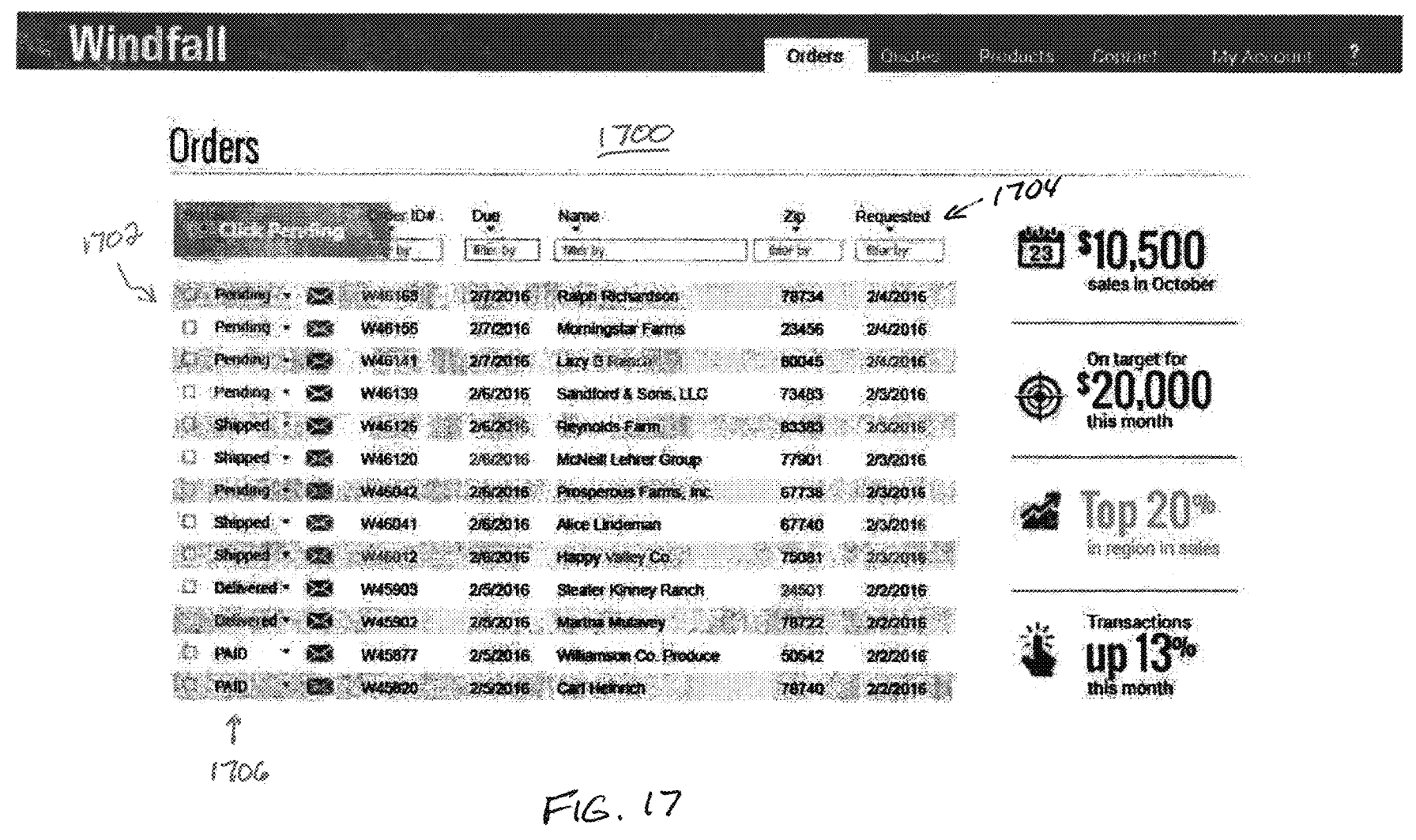

With regard to FIG. 17, a screenshot of an illustrative user interface 1700 that shows list of pending orders 1702 from quotes by a supplier that were accepted by farmers and listed in order by status thereof is shown. Sort fields 1704, including order ID #, due date, name, zip code, requested date, and/or otherwise may be provided to help the supplier find, prioritize, and/or optimize order fulfillment. An order status field 1706 may show the supplier which orders are pending, which have shipped, which have been delivered, and which have been paid. Other status identifiers may also be provided. In an embodiment, the status fields (e.g., "Shipped" and "Delivered") may automatically be updated using location identification technology, as further described herein.

Figure 18:
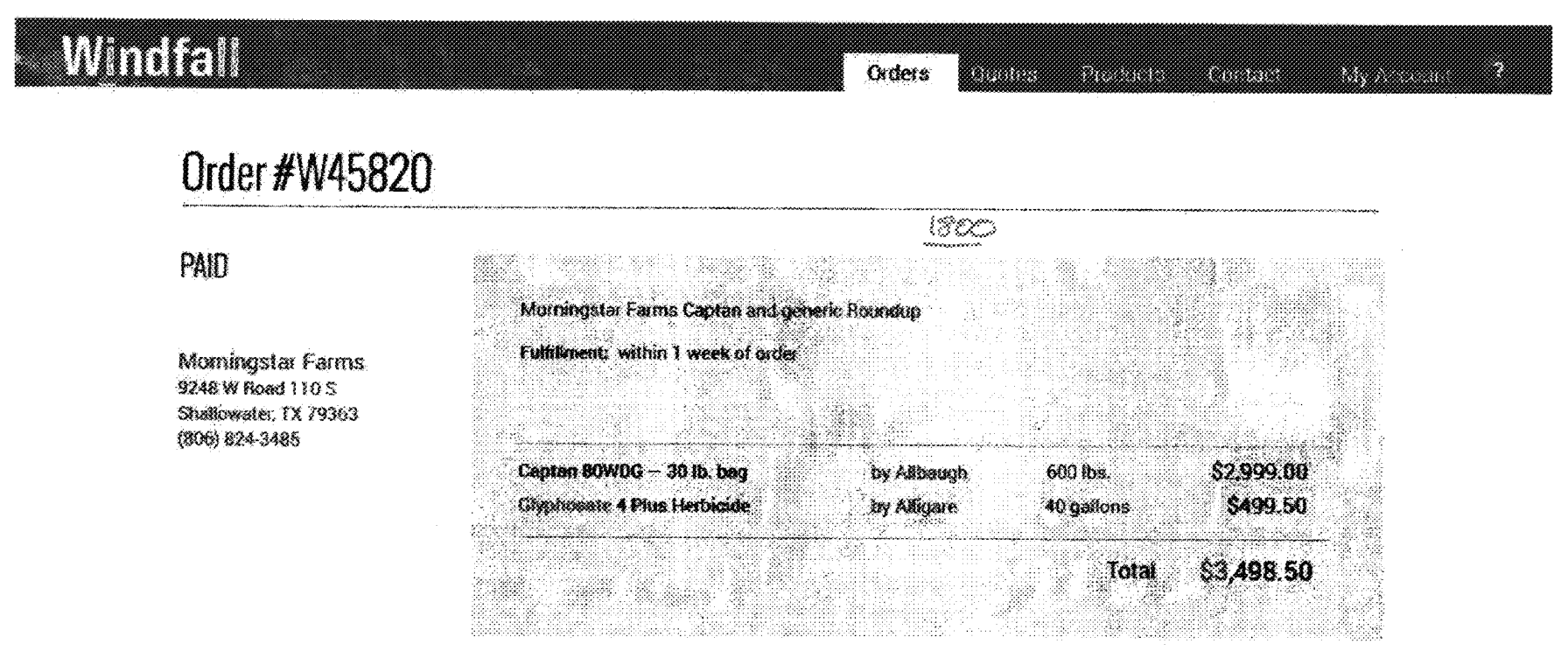

With regard to FIG. 18, a screenshot of an illustrative order 1800 that was paid is shown.

With regard to FIG. 19, a screenshot of an illustrative order user interface 1900 that was shipped is shown. With regard to FIG. 20, in response to the order that was shipped being paid for by the customer, a screenshot of a user interface 2000 indicative that the order that was paid is shown.

With further regard to FIG. 4, an aspect of the listing service server 402 may perform "big data" processing to assist with a delivery driver who delivers consumable farming supplies to a farmer. In that regard, and as previously described, because mobile communications services may be limited in certain geographic areas of farmers due to being in rural areas, having unfriendly environments for wireless communications (e.g., trees, hills, etc.), a mobile application provided by the listing service that supports the supplier in managing and delivering the consumable farming supplies may also be configured to communicate geographic location information on a periodic or aperiodic basis to the server 402. The server 402 may collect and store the geographic information, especially the geographic positioning information near a delivery location (e.g., within a few miles, a mile, a half-mile, or closer to where a pin is dropped or a physical address) so that future delivery drivers may follow "paths" of previous geographic locations collected from other delivery drivers who may or may not have been using the same wireless communications network. That is, in some cases, one communications service provider may have better communications coverage in some locations than others and vice versa so that an entire route or larger portion of a route to delivery locations may be determined through aggregating collected route data across one or more communication networks from mobile devices of one or more delivery drivers. Such collection of "big data" may be particularly useful in the rural areas, especially where roadways, dirt roads, and field paths can become impassable due to weather or other natural or man-made reasons, so that alternative routes that have been traveled to a farmer's barn or field, for example, can be followed by future delivery drivers.

Figure 21:
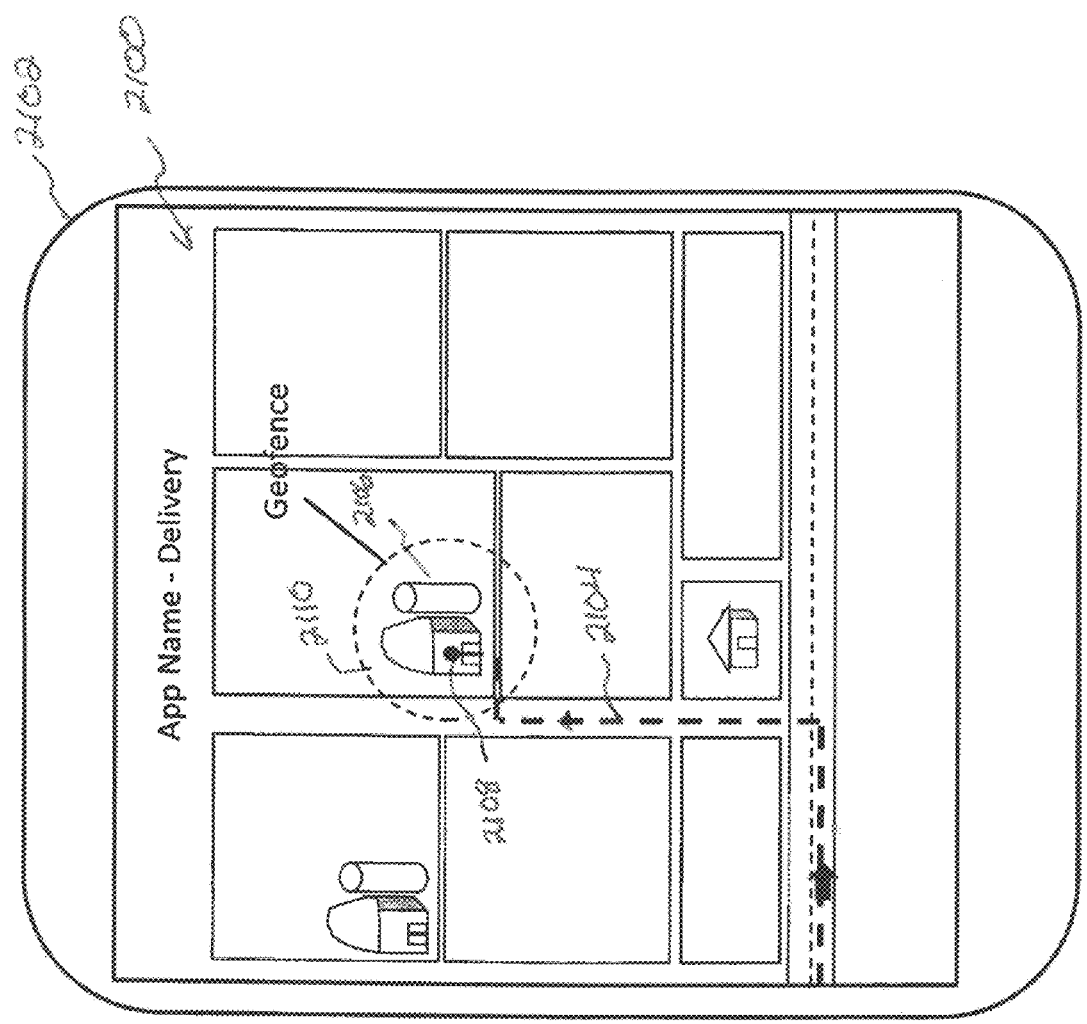
FIG. 21 is a screenshot of an illustrative map that includes a route for a delivery driver to take in making a delivery to a barn of a farmer.

With regard to FIG. 21, a screenshot of an illustrative map 2100 displayed on an illustrative mobile electronic device 2102 is shown. The map 2100 is shown to include a route for a delivery driver to follow in making a delivery to a delivery location 2106, such as a barn of a farmer, is shown. The route 2104 may be formed by a collection and processing of "big data" of previous delivery drivers. In one embodiment, mapping programs, such as Google Maps, may have incomplete or outdated detail in off-road situations, such as dirt roads and fields on private property. Hence, the route information is particularly beneficial to delivery drivers who do not have experience delivering to a particular delivery location (e.g., barn or field) of a particular farmer. As previously described, the "drop pin" function may be used by the farmer to drop a pin 2108, and such a feature is particularly helpful where no easy way to describe the exact location of a delivery location, such as a barn or field, is available on a conventional mapping program. In one embodiment, a route management engine operating by or in conjunction with the listing service server may engage a mapping program and display a route that is an aggregate of geographic location data ("breadcrumbs") from other delivery drivers to the dropped pin 2108 of a farmer. The farmer may name and store previously dropped pins, and select from those stored dropped pins for future deliveries.

As more delivery drivers drop deliveries over time, routes may be "filled in" as tracking of the delivery drivers routes is able to be collected and different routes may also be collected, thereby providing future delivery drivers selectable alternative routes, which may expedite deliveries depending on time of year (e.g., winter, rainy season, etc.), weather conditions, distance, previous delivery, familiarity with a route, or otherwise. Upon the delivery driver entering the geofence 2110 (i.e., within a certain distance of the dropped pin 2108), a message may automatically be generated and communicated to the listing service server (FIG. 4) or delivery support server (not shown), which, in response, may communicate a notification (e.g., text message) to the farmer to alert the farmer that the delivery has arrived—particularly helpful to a farmer when working in the field. In an embodiment, the geofence 2110 may be set by the farmer at one or more user selectable distances.

In addition to the geofencing being used for farmer notification purposes, the listing service may be notified of a delivery for status tracking purposes. Still yet, in response to the geofence 2110 being crossed, the application operating on a mobile 2102 or other electronic device may be configured to prompt the delivery service to submit an "order complete" indicator via a prompt (not shown) on the electronic device 2102. In one embodiment, responsive to the "order complete" indicator being submitted (or in response to the geofence message being generated), a farmer "order approve" message and/or prompt may be generated to enable the farmer to approve and accept the order. In one embodiment, the messages may be generated without actual affirmation by the delivery driver and/or farmer, but the system may enable the delivery driver and/or farmer to change the status in the event of a dispute. Again, the listing service may be considered a facilitator and not a broker in some embodiments, thereby allowing the supplier and farmer to establish and resolve contractual issues independent of the listing service.

Figures 22, 23:
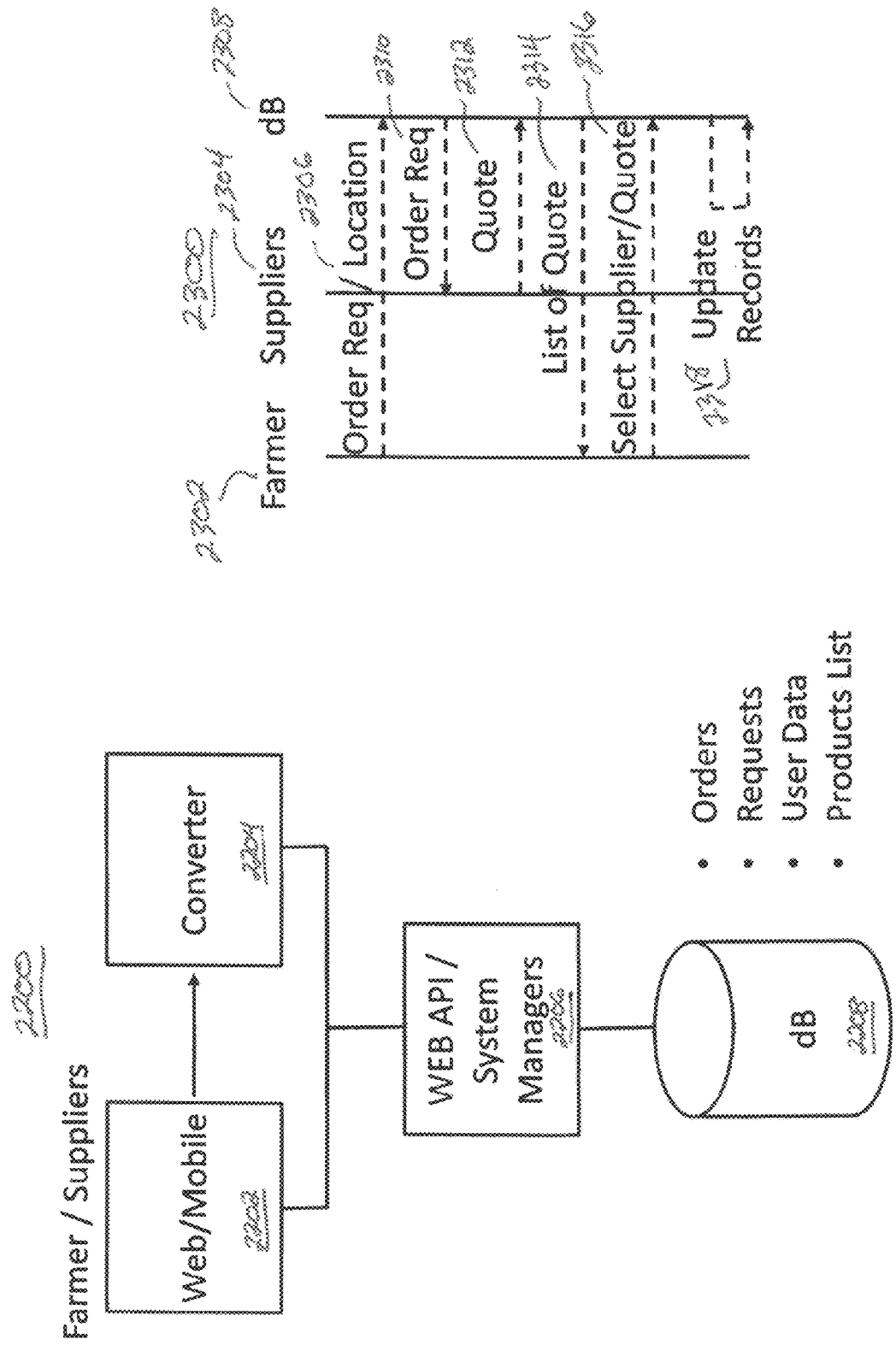
FIG. 22 is an illustration of an illustrative network environment in which a listing service for farmers and suppliers of consumable farming supplies is supported.
FIG. 23 is an interaction diagram of an illustrative process for a farmer to submit an order request, suppliers to submit quotes, and farmer to select a suppler/quote from a list presented thereto.

With regard to FIG. 22, an illustration of an illustrative network environment 2200 in which a listing service for farmers and suppliers of consumable farming supplies is supported is shown. The network environment 2200 includes web/mobile devices 2202, converter 2204 for converting software to be properly displayed on either of those devices, web API 2206 for a listing service to use in supporting a database 2208 inclusive of orders, requests, user data, and products list. System managers may be used to manage products, orders, quotes, order fulfillment, geographic location tracking of delivery drivers near (e.g., within a mile) of a delivery point established by a farmer, pin drops, and so forth. As an example, an order request manager (not shown) may be utilized to manage orders by farmers and quotes submitted by suppliers to fulfill the orders. The database 2208 may also be configured to receive and store transactions, status updates associated with orders, geographic location points of delivery drivers who drop off supplies to farms, and so forth.

A "big data" engine may be used to track geographic location points of delivery drivers who may use disparate mobile networks, and processes the geographic location points to produce routes that may be superimposed on an interactive map for display on or enhance an electronic device of a delivery driver, thereby enabling delivery drivers who have not delivered to farms in rural areas in the past. In an embodiment, the mobile app being executed on the mobile device of a delivery driver may capture acceleration data, and record vibrations to identify surface type (e.g., dirt road or field path based on fast vibrations or major bumps, for example) so as to notify future delivery drivers in case there is any concern about ability that a delivery vehicle type can be used for delivery. The surface type may be displayed on a user interface map, such as FIG. 21.

With regard to FIG. 23, an interaction diagram of an illustrative process 2300 for a farmer 2302 on an electronic device executing an app to submit an order request along with a delivery location (e.g., dropped pin location) 2306 to a database 2308 being accessible by a server, suppliers 2304 to receive the order request 2310 from the database 2308. The suppliers 2304 may submit a respective quote 2312 in response to the order request 2310. A list of quotes 2314 may be communicated or otherwise accessed by the farmer 2302 so that the farmer 2302 may select a suppler/quote 2316 from a list presented thereto is shown. The database 2308 may update records at step 2318. The process 2300 provides for an illustrative ordering process, and other aspects of the ordering process may be included, as well.

Figure 24:
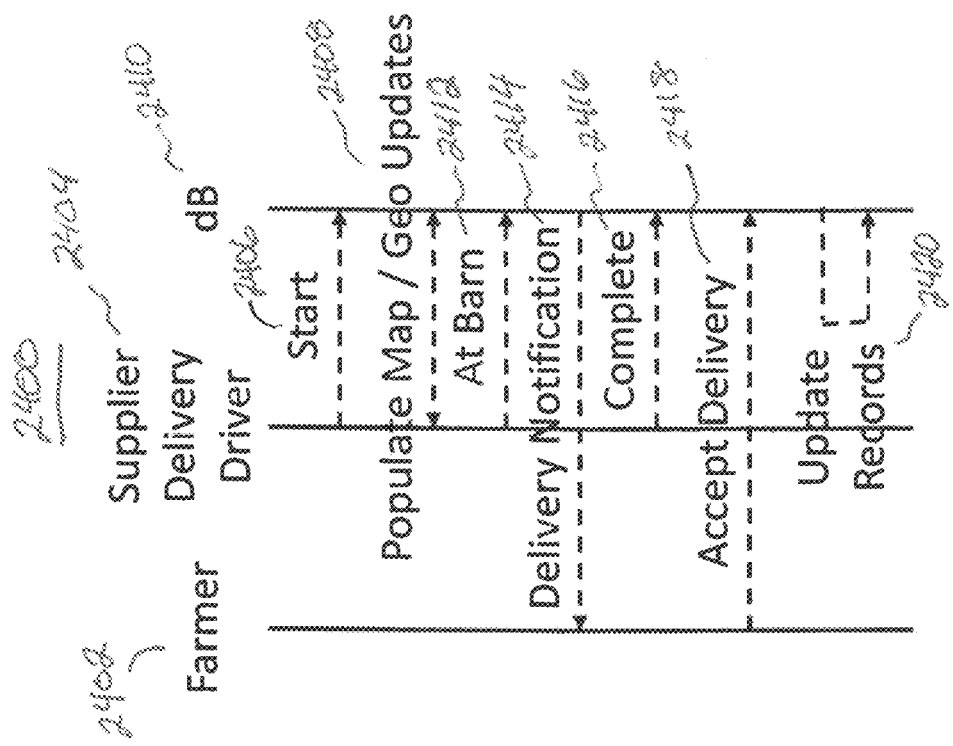
FIG. 24 is an interaction diagram of an illustrative process for a supplier to deliver supplies to a farmer.

With regard to FIG. 24, an interaction diagram of an illustrative process 2400 for a farmer 2402 using a mobile or other electronic device to receive supplies from a supplier to via a delivery driver 2404 using a mobile device is shown. The process 2400 may start at step 2406 by the delivery driver 2404 using his or her mobile app that populates a map of a delivery location along with geographic location updates 2408. The population of the map may include populating the map with delivery positional data from the same and/or other supplier delivery drivers, including drivers that use disparate technologies, operate communications devices supported by disparate communications networks, and so on such that gaps in coverage of a delivery driver's mobile electronic device can be supplemented by data from other drivers. In addition, multiple paths of driving to the destination location may be recorded and plotted onto the electronic map (e.g., Google Maps®).

The geographical updates may include the mobile device of the delivery driver 2404 communicating current location of the mobile device as the delivery driver 2404 is making a delivery to the farmer 2402. The geographic updates may be communicated in real-time or may be determined and/or estimated, collected, and communicated to a database 2410 being managed by a network server (not shown) when in communication range of a network (in the event that the mobile device has little or no communication with a mobile network). It should be understood that the geographic location updates are optional, and that the updates may be processed by a network server (not shown) to determine one or more routes to a particular destination in a rural area in which signs and roadways are limited.

In one embodiment, when a delivery driver exists an interactive map as a result of being in on a dirt road or a field path, for example, the interactive map may be automatically commanded to display satellite imagery and, optionally, a superimposed route on the map to assist a delivery driver to find a drop-off location, such as a barn, of the supplies. As the supplier delivery driver approaches a designation location, such as a barn, by crossing through a geofence, a notification 2412 may be communicated to the database 2410. The database 2410 (or server in communication with the database 2410) may communicate a delivery notification to the electronic device of the farmer 2402 using either push or pull communications techniques, as understood in the art, thereby notifying the farmer that the delivery has arrived. In response to the delivery driver 2404 completing a supply drop-off, the delivery driver 2404 may actively engage the mobile app that the delivery is complete or in response to the mobile device of the delivery driver 2404 exiting the geofence, a "delivery complete" notification message 2416 may be communicated to the database 2410. In an embodiment, the system may be configured to enable the farmer 2402 to communicate via a mobile or other application an "Accept Delivery" message 2418 to the database 2410, thereby completing the transaction between the supplier and farmer 2402. The database may update records at step 2420.

Figure 25:
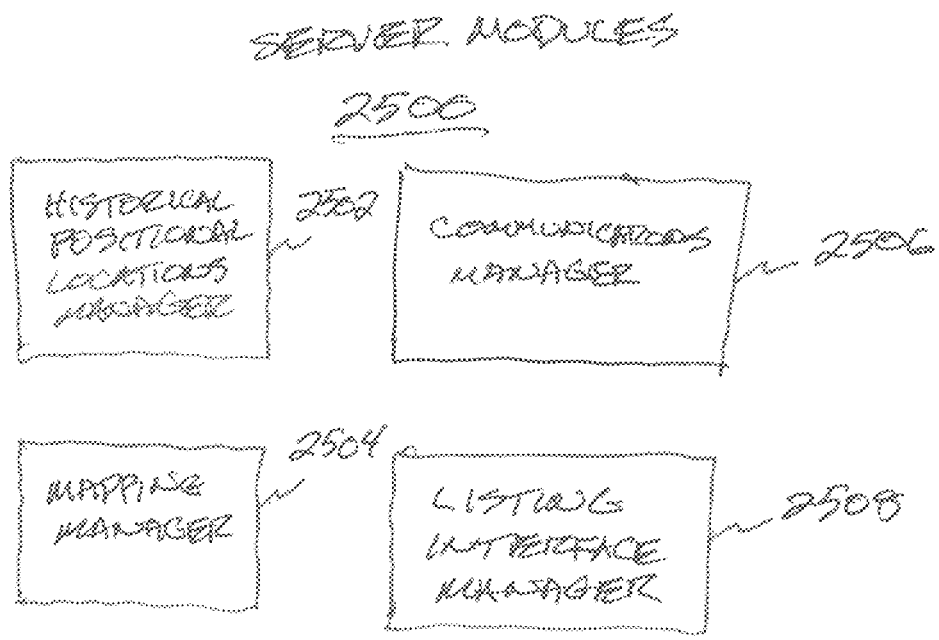
FIG. 25 is a block diagram of server modules that may be executed on a network server.

With regard to FIG. 25, a block diagram of server modules 2500 that may be executed on a network server is shown. The modules 2500 may include an historical positional locations manager 2502, mapping manager 2504, communications manager 2506, and listing interface manager 2508.

The historical positional locations manager 2502 may be configured to receive and process raw positional locations collected from electronic devices of delivery drivers or otherwise. The manager 2502 may process the raw positional locations to generate historical positional locations. In one embodiment, the processing may include averaging positional data. Alternatively, the processing may include correlating the propositional data. Still yet, the processing may be configured to estimating a straight line along the raw positional data collected from multiple electronic devices. The raw positional data may include global positioning system (GPS) or triangulation data collected from electronic devices. The manager 2502 may store time of year parameters associated with each set of oppositional data or historical positional locations. The storage of the raw positional locations or historical positional locations may be stored in a relational database, is understood in the art.

The mapping manager 2504 may be configured to apply the historical positional locations on a map. The map may be generated by an application executed by the server. In an environment, the mapping manager 2504 may be configured to receive coordinates of an electronic device of a delivery driver and determine a last location that the mapping application of the mobile device of the driver is capable of determine, and extend driving directions to a destination location from the last point based on the historical positional data.

The communications manager 2506 may be configured to communicate with electronic devices of delivery drivers. The communications manager 2506 may further be configured to communicate with other mapping applications and positioning applications via a communications network.

The listing interface manager 2508 may be configured to interface with a listing system, as previously described, that may include address and/or previous pin droppings of customers.

Figure 26:
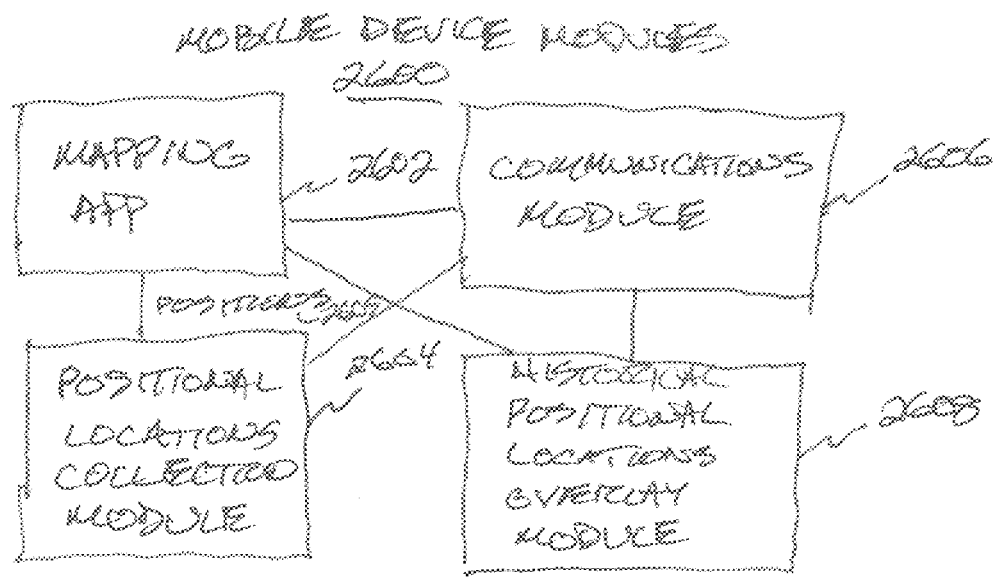
FIG. 26 is a block diagram of module used for providing driving directions for a delivery driver or otherwise.

With regard to FIG. 26, a block diagram of module 2600 used for providing driving directions for a delivery driver or otherwise is shown. The module 2600 may include a mapping application 2602, positional locations collection module 2604, communications module 2606, and historical positional locations overlay module 2608.

The mapping app 2602 may be a conventional mapping app, such as Google Maps® or other mapping application, as understand in the art. The mapping app 2602 may be configured to receive external directions that may be overlaid on a map generated by the app 2602.

The positional locations collection module 2604 may be configured to collect positions 2605 from the mapping app as a user of electronic device that is executing the mapping app is moving, thereby providing raw positional data that may be provided to a server, such as a server that executes the historical positional locations manager 2502 of FIG. 25. The positions 2605 may be GPS or triangulation positions that provide geographical coordinates as a delivery driver is driving to a destination location, such as a barn located on a field of a farmer. The module 2604 may be configured to communicate the geographical positions to a remote server via the communications module 2606 that may communicate the data over a communications network. In an embodiment, the communications are real-time. Alternatively, the positions may be stored and communicated when the electronic device is within range of a communications network. The communications module 2606 may be configured to receive historical positional location data to assist the mapping app 2602.

The historical positional locations overlay module 2608 may be configured to receive historical positional locations from the communications model 2606, and overlay the historical positional locations on a map being displayed by the mapping app 2602 for providing driving directions for a delivery driver, for example. In one embodiment, the historical positional locations overlay module 2608 may be configured to display historical positional locations in a different format than the mapping app 2602 displays conventional GPS mapping directions.

One embodiment of a system for providing directional guidance to a driver of goods to a destination location may include a data repository configured to store historical positional locations of delivery drivers who previously delivered goods to a destination location. The positional locations may be based on geographic coordinates from electronic devices carried by vehicles used to make the deliveries. The electronic devices may be mobile electronic devices or be electronic devices mounted on or within the vehicles. A processing unit may be configured to receive a destination location and access the data repository to identify historical positional locations associated with the destination location. At least a portion of the historical positional locations may be communicated to a mapping application being executed by an electronic device of a delivery driver. At least a portion of the historical positional locations may cause the mapping application to display the historical positional locations on a map to provide driving directions for the delivery driver.

The historical positional locations include multiple paths taken to the destination location that, when displayed on electronic device of the delivery driver, are selectable by the delivery driver. The processing unit may be further configured to generate the historical positional locations based on raw positional data collected from electronic devices of the delivery drivers. In an embodiment, the historical positional locations are average locations of the raw positional data. The data repository may further be configured to store the historical positional locations based on time of year, such as winter. The processing unit may further be configured to receive a request from the electronic device executing the mapping application for historical positional locations between a current location at which the mapping application has insufficient driving direction data and the destination location, thereby supplementing driving directions available to the mapping application. The processing unit may further be configured to cause the mapping application to overlay the historical positional locations on the map.

It should be understood that the features and functionality described herein may be applied to other uses, such as logging, fire and rescue, hiking in remote regions, skiing, or other situations in which conventional roadways are unavailable and travel along unpaved roadways or trails are to be used to reach certain destinations of users who may "drop a pin" on an interactive map. Moreover, rather than the historical positional locations being locations collected while driving, the historical positional locations may be collected while walking, running, skiing, hiking, riding a motorcycle or all terrain vehicle, riding a horse, or using any other form of movement.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A system for providing directional guidance to a driver of goods to a destination location, said system comprising:
 a data repository configured to store historical positional locations of delivery drivers who previously delivered goods to a destination location, the positional locations being based on geographic coordinates from electronic devices carried by vehicles used to make the deliveries;
 a processing unit configured to:
  receive a destination location;
  access said data repository to identify historical positional locations associated with the destination location;
  communicate at least a portion of the historical positional locations to a mapping application being executed by an electronic device of a delivery driver, at least a portion of the historical positional locations causing the mapping application to display the historical positional locations on a map to provide driving directions for the delivery driver;
  determine that the destination location is beyond a last mappable location of the mapping application; and
  in response to determining that the driver passes the last mappable location, automatically command the mapping application to display satellite imagery.

2. The system according to claim 1, wherein the electronic devices are mobile telephones.

3. The system according to claim 1, wherein the electronic devices are GPS devices installed in delivery vehicles.

4. The system according to claim 1, wherein the historical positional locations include a plurality of paths taken to the destination location that, when displayed on electronic device of the delivery driver, are selectable by the delivery driver.

5. The system according to claim 1, wherein said processing unit is further configured to generate the historical positional locations based on raw positional data collected from electronic devices of the delivery drivers.

6. The system according to claim 5, wherein the historical positional locations are average locations of the raw positional data.

7. The system according to claim 1, wherein said data repository is further configured to store the historical positional locations based on time of year.

8. The system according to claim 1, wherein said processing unit is further configured to receive a request from the electronic device executing the mapping application for historical positional locations between a current location at which the mapping application has insufficient driving direction data and the destination location, thereby supplementing driving directions available to the mapping application.

9. The system according to claim 1, wherein said processing unit is further configured to cause the mapping application to overlay the historical positional locations on the map.

10. The system according to claim 1, wherein the destination location is established by a user dropping a pin on the map via a user interface of the mapping application.

11. The system according to claim 10, wherein the dropped pin is located away from paved roads.

12. A user interface, comprising:
 an interactive map supported by a mapping app, and configured to enable a user to drop a pin on the interactive map to indicate a location for supplies to be delivered;
 an order interface configured to enable a user to select a supplier of supplies to be delivered to the location represented by the pin;
 an order request manager configured to communicate a request of an order and the location represented by the pin dropped on the interactive map to an order server, the location represented by the pin being at a mappable location or non-mappable location;
 an historical positional locations overlay module in communication with the interactive map, and configured to overlay historical positional locations on the interactive map including superimposing historical paths of deliveries on the interactive map, the mapping app and/or historical positional locations overlay module to automatically display satellite image data on the interactive map when a delivery of the order is being made to the location represented by the pin at a non-mappable location and a delivery driver passes a last mappable location.

13. The user interface according to claim 12, wherein the location is defined by global positioning system coordinates.

14. A method for providing directional guidance to a driver of goods to a destination location, said method comprising:
    storing historical positional locations of delivery drivers who previously delivered goods to a destination location;
    receiving a destination location;
    identifying historical positional locations associated with the destination location;
    communicating at least a portion of the historical positional locations to a mapping application being executed by an electronic device of a delivery driver, at least a portion of the historical positional locations causing the mapping application to display the historical positional locations on a map to provide driving directions for the delivery driver;
    determining that the destination location is beyond a last mappable location of the mapping application; and
    in response to determining that the driver passes the last mappable location, automatically commanding the mapping application to display satellite imagery.

15. The method according to claim 14, wherein the electronic device is a mobile telephone.

16. The method according to claim 14, further comprising:
    receiving raw positional data of electronic devices of delivery drivers to provide paths taken by the delivery drivers; and
    processing the raw positional data to generate the historical positional locations.

17. The method according to claim 16, wherein the historical positional locations are average locations of the raw positional data.

18. The method according to claim 14, further comprising storing the historical positional locations based on time of year.

19. The method according to claim 14, further comprising receiving a request from the electronic device executing the mapping application for historical positional locations between a current location at which the mapping application has insufficient driving direction data and the destination location, thereby supplementing driving directions available to the mapping application.

20. The method according to claim 14, further comprising causing the mapping application to overlay the historical positional locations on the map.

* * * * *